United States Patent
Kim et al.

(10) Patent No.: US 11,686,474 B2
(45) Date of Patent: Jun. 27, 2023

(54) DAMPER FOR SWIRL-CUP COMBUSTORS

(71) Applicant: General Electric Company, Schenectady, NY (US)

(72) Inventors: Kwanwoo Kim, Cincinnati, OH (US); Clayton Cooper, Loveland, OH (US); Steven Vise, Loveland, OH (US); Shai Birmaher, Cincinnati, OH (US); Pradeep Naik, Karnataka (IN); Andrew Wickersham, Liberty Township, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 17/192,613

(22) Filed: Mar. 4, 2021

(65) Prior Publication Data
US 2022/0282870 A1    Sep. 8, 2022

(51) Int. Cl.
*F23R 3/28* (2006.01)
*F02C 7/22* (2006.01)
*F23M 20/00* (2014.01)

(52) U.S. Cl.
CPC ............ *F23R 3/286* (2013.01); *F02C 7/22* (2013.01); *F23M 20/005* (2015.01); *F05D 2240/35* (2013.01); *F05D 2260/963* (2013.01); *F23R 2900/00014* (2013.01)

(58) Field of Classification Search
CPC ........... F23R 3/286; F23R 2900/00014; F23M 20/005; F02C 7/22; F05D 2240/35; F05D 2260/963
See application file for complete search history.

(56) References Cited

U.S. PATENT DOCUMENTS

| | | | |
|---|---|---|---|
| 5,956,955 A * | 9/1999 | Schmid | F23R 3/10 60/804 |
| 6,351,947 B1 * | 3/2002 | Keller | F23R 3/002 60/725 |
| 9,677,505 B2 | 6/2017 | Savary et al. | |
| 9,810,152 B2 | 11/2017 | Genin et al. | |
| 9,933,163 B2 * | 4/2018 | Pasqualotto | F23R 3/286 |
| 10,018,088 B2 * | 7/2018 | Eroglu | F23M 20/005 |
| 10,808,935 B2 | 10/2020 | Staufer et al. | |
| 2013/0019602 A1 * | 1/2013 | Kim | F23R 3/286 60/725 |
| 2013/0042627 A1 * | 2/2013 | Gerendas | F23M 20/005 60/725 |

(Continued)

FOREIGN PATENT DOCUMENTS

| | | |
|---|---|---|
| EP | 1174662 B1 | 8/2008 |
| EP | 1801504 B1 | 8/2012 |
| GB | 2239961 A | 7/1991 |

*Primary Examiner* — Arun Goyal
*Assistant Examiner* — Henry Ng
(74) *Attorney, Agent, or Firm* — Venable LLP; Elizabeth C. G. Gitlin; Michele V. Frank

(57) ABSTRACT

A gas turbine engine may include a combustion section having a fuel nozzle, a swirler, and a ferrule configured to mount and center the fuel nozzle with the swirler. The combustion section may further include a damper on a cold side of the combustion section. The damper may have an acoustic cavity, a damper neck, and a cavity feed hole. The damper may operate as Helmholtz cavity to absorb a hydrodynamic or acoustic instability present in a region within the swirler.

20 Claims, 15 Drawing Sheets

(56) References Cited

U.S. PATENT DOCUMENTS

| | | | |
|---|---|---|---|
| 2014/0123658 A1* | 5/2014 | Kidder | F23M 20/005 |
| | | | 60/772 |
| 2014/0284394 A1 | 9/2014 | James et al. | |
| 2016/0076772 A1* | 3/2016 | Metternich | F23R 3/26 |
| | | | 60/722 |
| 2017/0321895 A1* | 11/2017 | Kim | F23R 3/002 |
| 2017/0343216 A1* | 11/2017 | McMahan | F23R 3/286 |
| 2018/0163967 A1* | 6/2018 | Arellano | F23R 3/286 |
| 2018/0172273 A1 | 6/2018 | Purcell et al. | |
| 2018/0274780 A1* | 9/2018 | Kim | F23R 3/10 |
| 2020/0200390 A1 | 6/2020 | Lundgren et al. | |
| 2021/0341150 A1* | 11/2021 | Matsuyama | F23R 3/002 |

\* cited by examiner

DAMPER FOR SWIRL-CUP COMBUSTORS

TECHNICAL FIELD

The present disclosure relates to a damper for a combustion section in an engine, such as, a gas turbine engine. More specifically, the present disclosure relates to a damper for acoustic and/or hydrodynamic instabilities in a swirler of the combustion section.

BACKGROUND

In a gas turbine engine, a conventional swirl-cup design employs a ferrule, a fuel nozzle, and a swirler. The swirler is provided to mix air and fuel for combustion. The ferrule may allow purge air therethrough. Conventional combustor design further uses a cowl to distribute the flow between the combustor and passages.

BRIEF SUMMARY

According to an embodiment, a gas turbine engine may comprise a combustion section having a cold side and a hot side, wherein the cold side of the combustion section comprises: a fuel nozzle; a swirler; a ferrule configured to mount and center the fuel nozzle with the swirler; and a damper having an acoustic cavity, a damper neck, and a damper neck opening, wherein the damper operates as Helmholtz cavity and is configured to absorb a hydrodynamic or acoustic instability present in a region within an interior of the swirler.

According to an embodiment, a damper for suppressing a hydrodynamic or acoustic instability in a combustion chamber of a gas turbine engine may include an acoustic cavity having a volume; a cavity feed hole configured to provide air to the acoustic cavity; and a damper neck, wherein the acoustic cavity, the cavity feed hole, and the damper neck are integral and unitary within a body of a ferrule, and wherein the acoustic cavity, the cavity feed hole, and the damper neck are dimensioned to absorb a frequency of hydrodynamic or acoustic instability in the combustion chamber.

According to an embodiment, a gas turbine engine may include a fuel nozzle mounted in a ferrule; a swirler configured to mix air and fuel in a combustion section; and a damper integral and unitary with the ferrule, wherein the damper is dimensioned to absorb a frequency of hydrodynamic or acoustic instability in the swirler.

Additional features, advantages, and embodiments of the disclosure are set forth or apparent from consideration of the following detailed description, drawings and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

Air flowing through a conventional swirl-cup design may generate an acoustic or hydrodynamic instability in a region within the combustion chamber due to the flow therethrough. This instability is naturally occurring and may generate large fluctuations of pressure and velocity that may lead to combustion dynamics. The present disclosure provides a damper to suppress these hydrodynamic and/or acoustic instabilities created by the swirler and provide flow guidance between the combustor.

The present disclosure is directed to an acoustic damper that may provide an acoustic cavity around a ferrule, a swirler, or both a ferrule and a swirler. The acoustic cavity may operate as a Helmholtz resonator that may dampen the frequency of a hydrodynamic and/or acoustic instability within the combustion chamber. The acoustic cavity may be sized to target a particular frequency of the hydrodynamic and/or acoustic instability. The damper may include more than one acoustic cavity (e.g., a multi-chamber, multi-volume, or multi-cavity damper) based on the desired dampening and desired flow conditions within the combustor. Where a multi-cavity damper is provided, the damper may function as a flow conditioning device as well as acoustic dampers. The present disclosure may provide dampening that interacts directly with the source of the hydrodynamic and/or acoustic instability to reduce or eliminate the instability (e.g., interacts directly with the vibration in the flow that results in the instability).

The present disclosure provides a system and method for suppressing hydrodynamic and/or acoustic instability from swirlers for reducing flow dynamics by employing a damper surrounding the swirler. The present disclosure mitigates combustion dynamics by introducing the acoustic cavities to the combustion section. In some examples, the damper may be a multi-cavity damper surrounding the swirler as well as a cavity embedded in the ferrule. The shape of the cavity surrounding the swirlers can have an aerodynamic shape as well that may be used as flow conditioning device, in addition to the damper, to guide flow.

Figure 1:
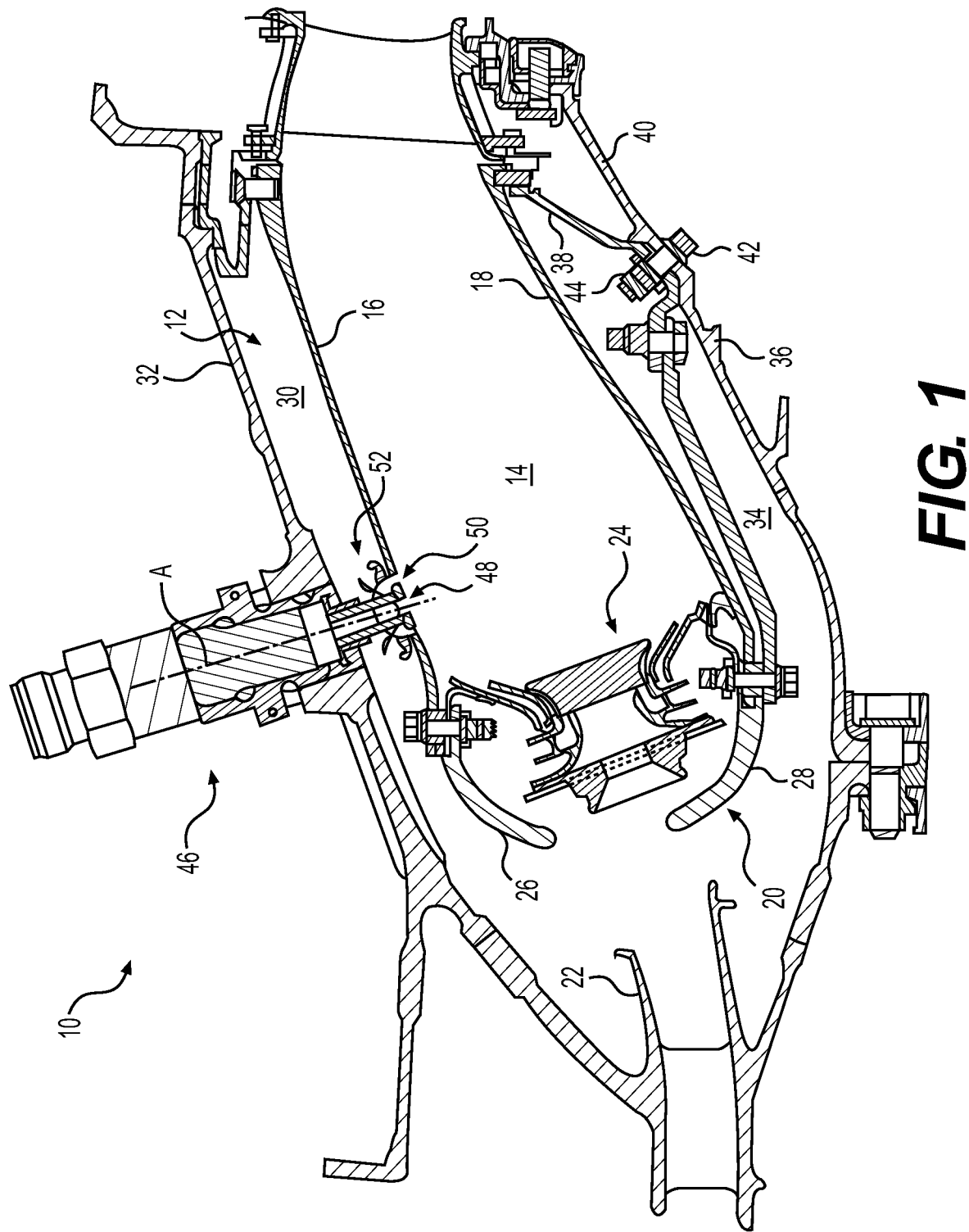
FIG. 1 shows a schematic, cross-section view of a combustion section of a gas turbine engine, according to an embodiment of the present disclosure.

FIG. 1 shows a schematic, cross-sectional view of a combustion section 10 of an engine, such as, for example, a gas turbine engine. The combustion section 10 may include a combustor 12 that generates the combustion gases discharged into the turbine section (not shown) of the engine.

The combustor 12 may include a combustion chamber 14 that may be bound by an outer liner 16, an inner liner 18, and a cowl 20 comprising an outer cowl 26 and an inner cowl 28. Additionally, a diffuser 22 may be positioned upstream of the combustion chamber 14. The diffuser 22 may receive an airflow from the compressor section (not shown) of the engine and may provide the flow of compressed air to the combustor 12. The diffuser 22 may provide the flow of compressed air to cowl 20 of a swirler 24. The cowl 20 may distribute the flow aerodynamically between the combustor 12 and passages within a ferrule (not shown) surrounding the swirler 24.

With continuing reference to FIG. 1 a fuel nozzle (FIGS. 2A and 2B, 56) may provide fuel to swirler 24 in accordance with a desired performance of the combustor 12 at various engine operating states. The cowl 20 (e.g., outer annular cowl 26 and inner annular cowl 28) may be located upstream of the combustion chamber 14 so as to direct air flow into swirler 24. The cowl 20 may also direct a portion of the flow of air from the diffuser 22 to an outer passage 30 defined between the outer liner 16 and an outer casing 32 and to an inner passage 34 defined between the inner liner 18 and an inner casing 36. An inner support cone 38 may be connected to a nozzle support 40 by, for example, a plurality of bolts 42 and nuts 44. Other suitable structural configuration are contemplated.

Referring still to FIG. 1, an igniter 46 is provided so as to ignite the fuel/air mixture supplied to combustion chamber 14. The igniter 46 may be attached to the outer casing 32 of the combustor 12 in a substantially fixed manner. Additionally, the igniter 46 may extend generally along an axial direction A, defining a distal end 48 that is positioned proximate to an opening in a combustor member of the combustion chamber 14. The distal end 48 may be positioned proximate to an opening 50 defined by the outer liner 16 of the combustor 12 to the combustion chamber 14. Different materials may form the outer liner 16 of the combustor 12 and the outer casing 32 of the combustor 12, the distal end 48 of the igniter 46 may need to be movable relative to the outer liner 16 of the combustor 12. Accordingly, a mounting assembly 52 may be provided to mount the igniter 46 to the outer liner 16 of the combustor 80.

Figure 2A:
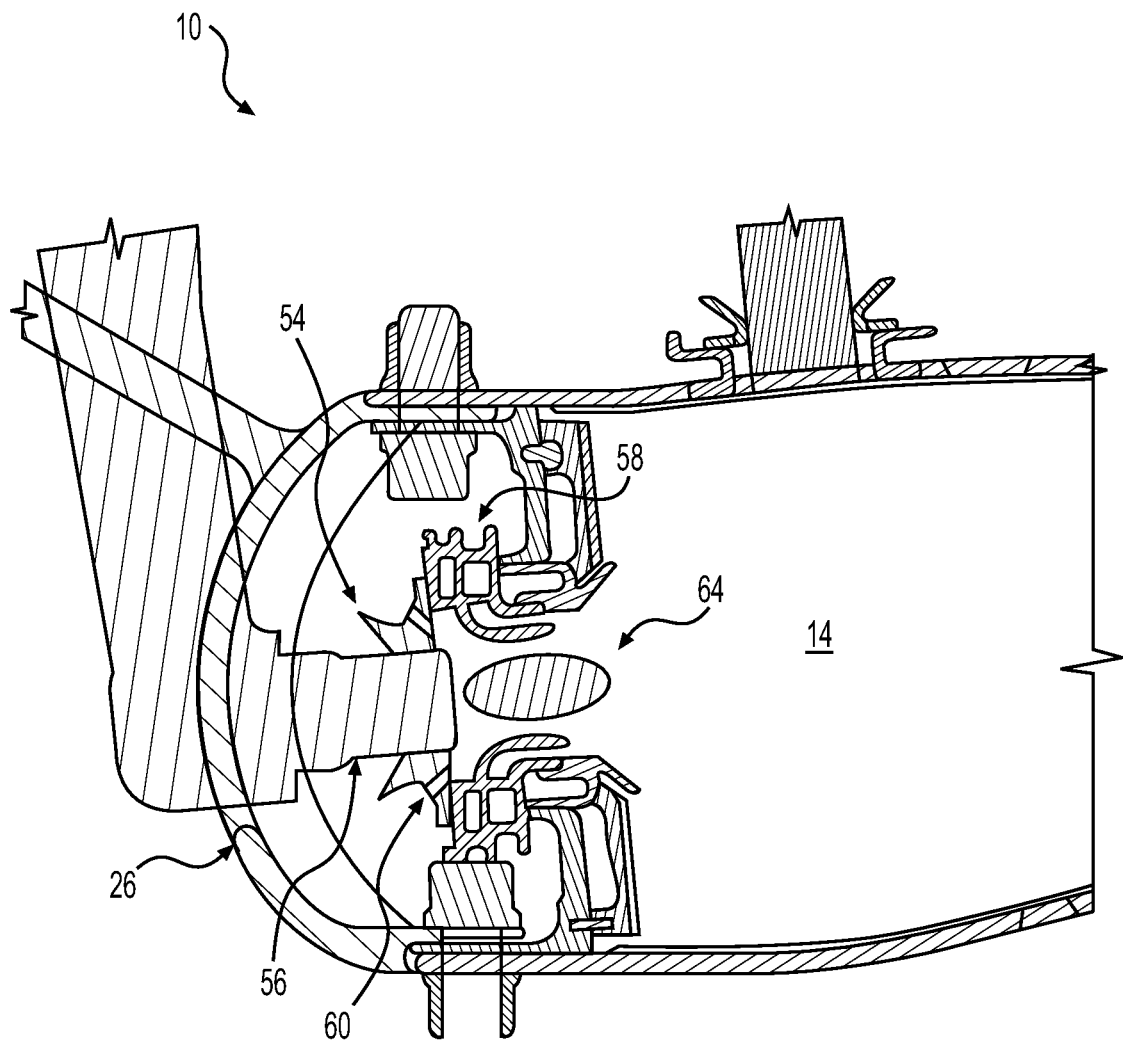
FIG. 2A shows a close-up, schematic, cross-section view of fuel nozzle of a combustion section having purge air passage through a ferrule, according to an embodiment of the present disclosure.
Figure 2B:
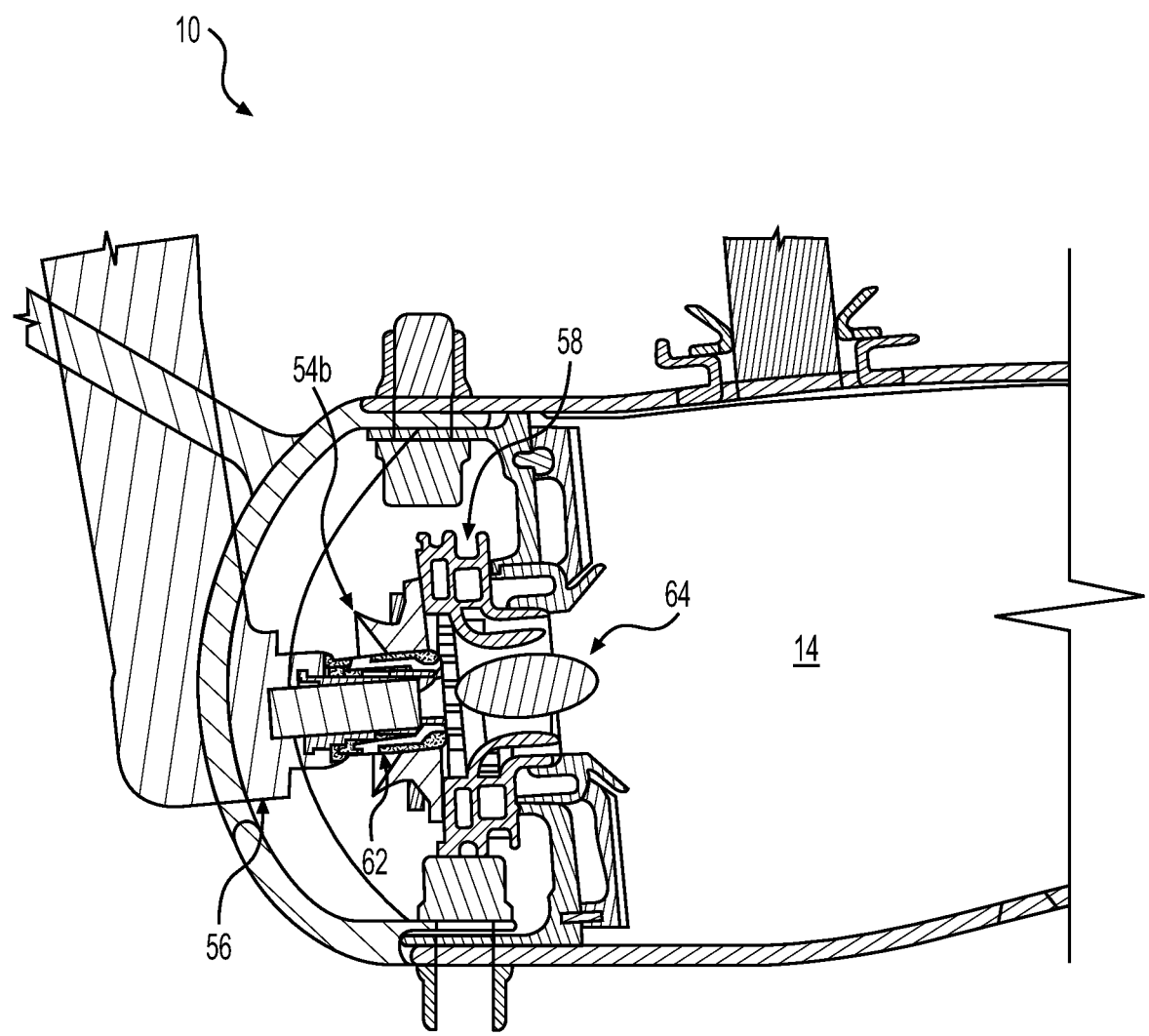
FIG. 2B shows a close-up, schematic, cross-section view of fuel nozzle of a combustion section having purge air passage around the fuel nozzle, according to an embodiment of the present disclosure.

Referring to FIGS. 2A and 2B, exemplary purge air configurations are contemplated.

In FIG. 2A, purge air may be provided through a ferrule 54 as shown in the close-up, schematic, cross-section view of the combustion section 10. The combustion section 10 may include the fuel nozzle 56 and a swirler 58. The fuel nozzle 56 may be centered in the swirler 58 with the ferrule 54. The ferrule 54 may be used to mount the fuel nozzle 56 and may interface with the swirler 58. The ferrule 54 may include one or more purge air passages 60. The one or more purge air passages 60 may permit passage of air therethrough and into the combustion chamber 14.

In FIG. 2B, purge air may be provided not through a ferrule 54b, but through a fuel nozzle 56 as shown in the close-up, schematic, cross-sectional view of a combustion section 10. The combustion section 10 may be similar to the combustion section 10 of FIG. 2A and may include the fuel nozzle 56 mounted and centered in a swirler 58 with the ferrule 54b. In the example of FIG. 2B, a purge air passage 62 may extend around the fuel nozzle 56 such that the purge air passage 62 extends between an outer surface of the fuel nozzle 56 and an inner surface of the ferrule 54b. The purge air passage 62 may permit passage of air therethrough and into the combustion chamber 14.

The air flowing through the swirler 58 of FIGS. 2A and 2B may generate an acoustic and/or hydrodynamic instability in a region 64 within the combustion chamber 14 due to the flow therethrough. This instability is naturally occurring at one or more specific frequencies based on the dimensions and flow through the swirler. The hydrodynamic and/or acoustic instability may generate fluctuations of pressure and velocity that may lead to combustion dynamics. In order to reduce or eliminate the hydrodynamic and/or acoustic instability in the region 64 (and thus eliminate or reduce the fluctuations in pressure and velocity), a damper may be provided within the combustion section 10. The damper may be sized and designed to exactly match or closely match the frequency of the hydrodynamic instability to suppress, reduce, and/or eliminate the hydrodynamic instability in the region 64. That is, the damper may target a specific frequency of instability within the combustion chamber 14 and may be designed to counteract that specific frequency.

Figure 2C:
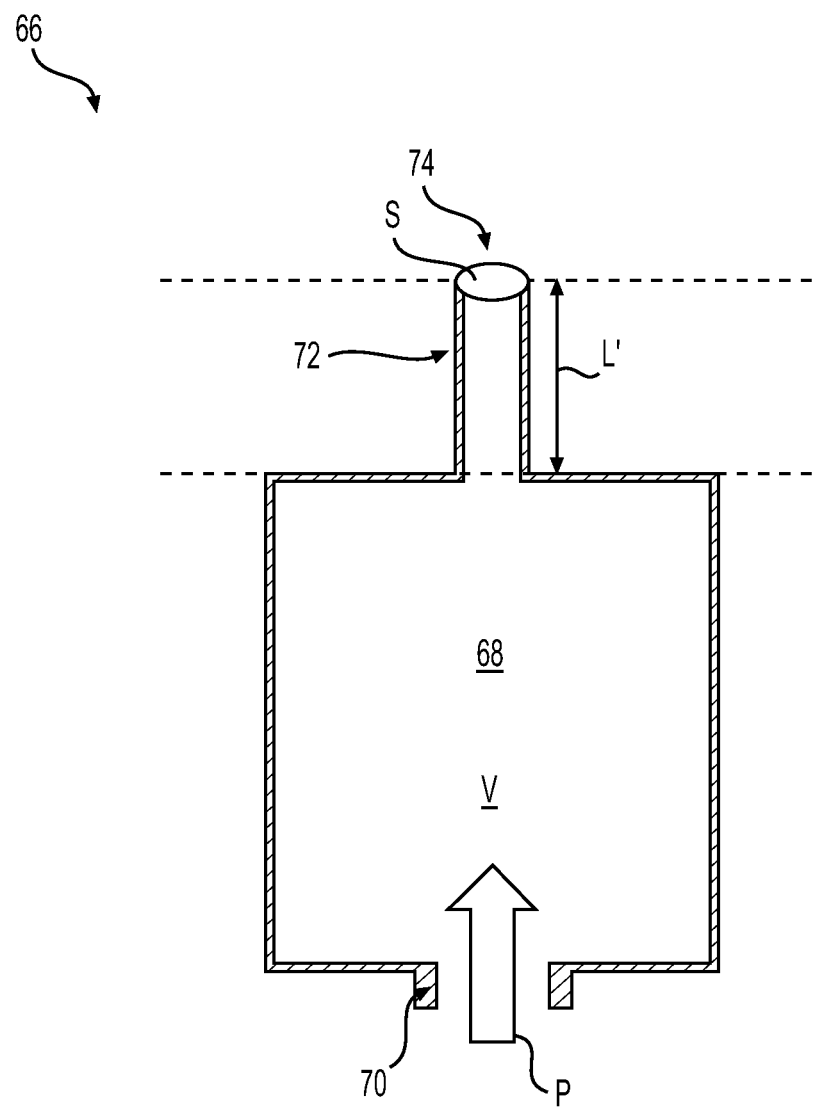
FIG. 2C shows a schematic view of a damper, according to an embodiment of the present disclosure.

FIG. 2C depicts schematic of a damper 66. The damper 66 may operate as a Helmholtz cavity. The damper 66 may include a cavity 68 having a volume V. The damper 66 may include an opening 70 that may allow purge air P to flow into the cavity 68. The damper 66 may include a neck 72 between the cavity 68 and a neck opening 74. The neck opening 74 may have a cross-sectional area S and the neck 72 may have a length L'. The frequency at which the damper 66 may dampen may be calculated with Equation 1, where c is the speed of sound, S is the cross-sectional area of the neck opening 74, V is the volume of the cavity 68, and L' is the length of the neck 72. In examples where multiple neck openings 74 are included, the area S may be the sum of all of the cross-sectional areas of the neck openings 74. Exemplary dampers are shown in FIGS. 3-11.

$$f = \frac{c}{2\pi} \sqrt{\frac{S}{VL'}} \qquad \text{Equation 1}$$

Figure 3:
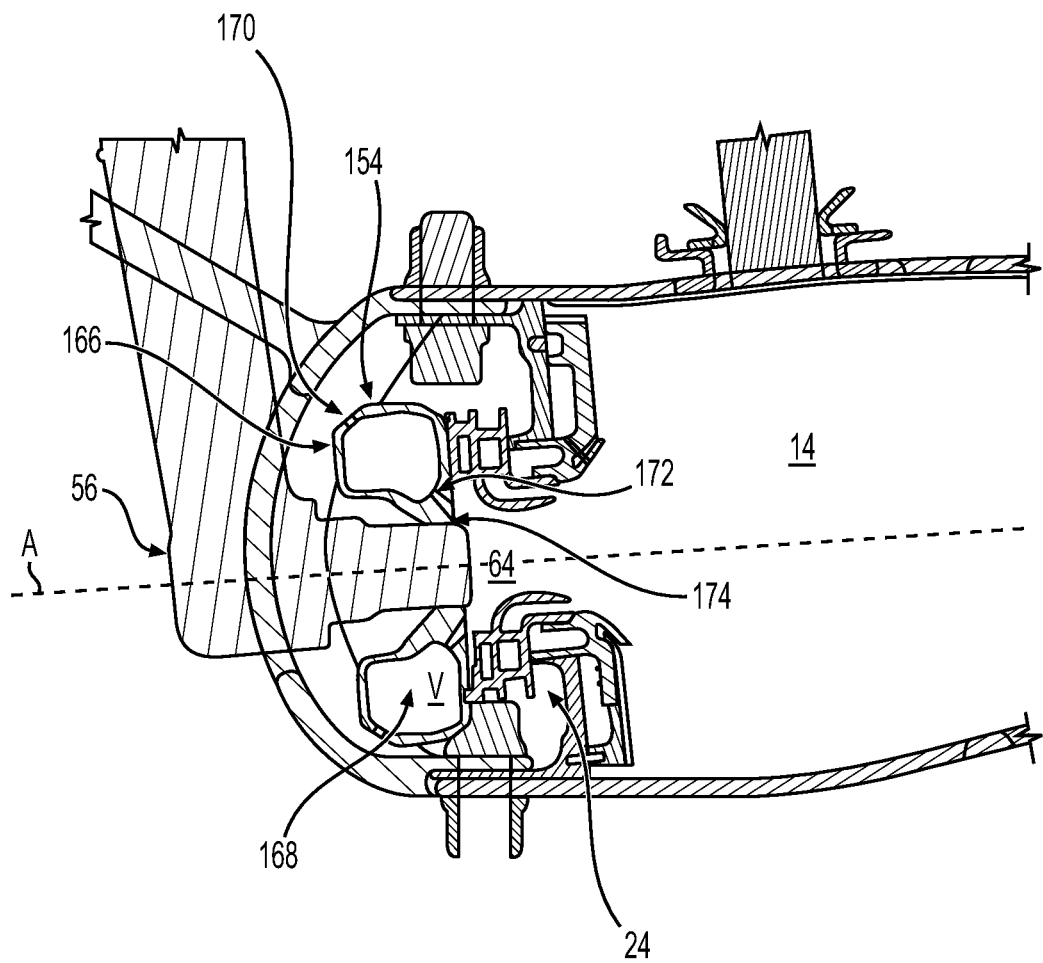
FIG. 3 shows a close-up, schematic, cross-section view of a fuel nozzle having a ferrule with a damper, according to an embodiment of the present disclosure.

FIG. 3 shows a close-up, schematic, cross-section view of a fuel nozzle 56 having a ferrule 154 with an exemplary damper 166. The damper 166 may be in the ferrule 154. The ferrule 154 may be configured to include the damper 166. The damper 166 may be formed integrally and unitarily with the ferrule 154 such that an acoustic cavity 168 is arranged and/or formed within a body of the ferrule 154. That is, the damper 166 may take the form of the acoustic cavity 168 within the ferrule 154. The ferrule 154 may be annular in shape. The ferrule 154 may be positioned around the outer circumference of the fuel nozzle 56. The acoustic cavity 168 may be an annular shape. The volume V of the acoustic cavity 168 may be selected to target a specific frequency of hydrodynamic and/or acoustic instability.

The damper 166 may include passages or openings allowing flow into and out of the acoustic cavity 168. Each aspect can be sized for the required flow and damping performance. For example, the damper 166 may include a purge passage, an inlet opening to the acoustic cavity, and/or an outlet opening to the acoustic cavity. In some examples, the passages and/or openings may be combined into a single passage and/or opening. That is, for example in FIG. 3, the acoustic cavity outlet and the purge passage outlet may both be achieved with opening 174 and the acoustic cavity inlet and the purge passage inlet may both be achieved by opening 170.

As shown in FIG. 3, the damper 166 may include an opening 170. The opening 170 may be a cavity feed hole providing air to the cavity 168 from upstream of the combustion section. The opening 170 may permit air to pass through the ferrule 154 and into the combustion chamber 14. The opening 170 may be circular in cross-section. The opening 170 may be located or placed on any surface of the ferrule 154 that is upstream of the swirler 24.

Although two openings 170 are shown, more or fewer openings may be provided. Where multiple openings 170 are provided, they may be circumferentially spaced around the ferrule 154. The spacing of the openings 170 may be uniform or random. The number, shape, location, size, spacing, or any combination thereof of the openings 170 may be selected based on the target frequency of the hydrodynamic instability, based on the desired purge air flow through the ferrule 154, or based on both the target frequency of the hydrodynamic instability and the desired purge air flow through the ferrule 154.

As further shown in FIG. 3, the damper may include a neck 172 and neck opening 174. The neck 172 may function as a damper neck, as a passage for purge air (e.g., allowing air to flow from the opening 170 through the acoustic cavity 168 and neck 172 and out the neck opening 174), or as both a damper neck and a passage for purge air. The neck 172 and the neck opening 174 may be circular in cross-section. The neck 172 may be positioned at various angles with respect to a central axis A through the fuel nozzle 56.

Figure 5A:
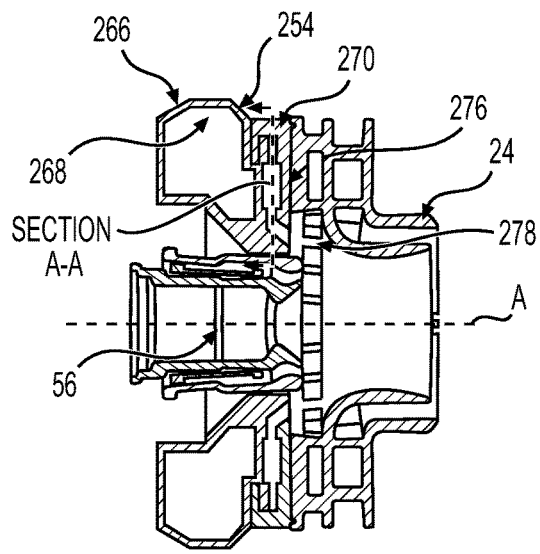
FIG. 5A shows a schematic, cross-section view of a fuel nozzle having a ferrule with a damper separate from a purge air passage, according to an embodiment of the present disclosure.
Figure 5B:
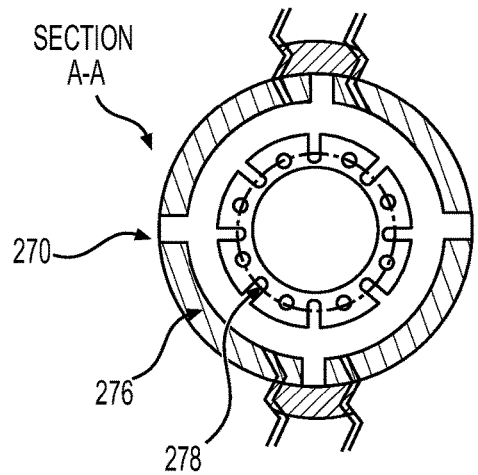
FIG. 5B shows a schematic, cross-section view of the purge air passage of FIG. 5A taken along the section line A-A of FIG. 5A, according to an embodiment of the disclosure.
Figure 5C:
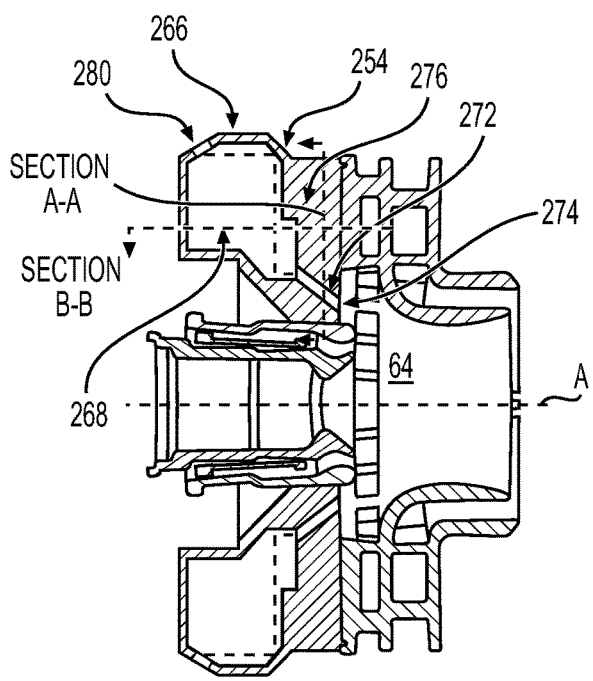
FIG. 5C shows a schematic, cross-section view of FIG. 5A rotated about the axis A and showing the damper cavity and passages, according to an embodiment of the disclosure.
Figure 5D:
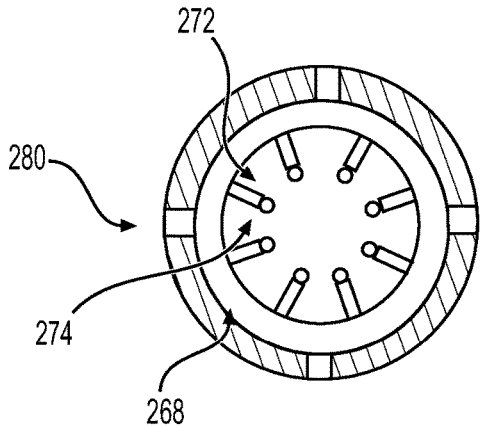
FIG. 5D shows a schematic, cross-section view of the damper cavity of FIG. 5C taken along the section line B-B of FIG. 5C, according to an embodiment of the disclosure.

Although two necks 172 with neck openings 174 are shown, more or fewer necks may be provided (see, for example, FIG. 5D showing how multiple necks and openings may be present around the ferrule). Where multiple necks 172 with necks opening 174 are provided, they may be circumferentially spaced around the ferrule 154. The spacing of the necks 172 with neck openings 174 may be uniform or random. The number, shape, location, size, spacing, angle, or any combination thereof of the neck 172 and the number, shape, location, size, spacing, angle, or any combination thereof of the neck openings 174 may be selected based on the target frequency of the hydrodynamic instability, based on the desired purge air flow through the ferrule 154, or based on both the target frequency of the hydrodynamic instability and the desired purge air flow through the ferrule 154.

Accordingly, with continued reference to FIG. 3 and during operation, air is permitted to flow through the opening 170 into the acoustic cavity 168, through the neck 172 and exits the neck opening 174 into the swirler 24. The air exiting the swirler 24 creates high pressure and velocity fluctuations in the region 64 and results in a hydrodynamic and/or acoustic instability. However, the damper 166 operates as a Helmholtz cavity. That is, the air that passes into opening 170 resonates or vibrates within the acoustic cavity 168. The frequency of vibration of the air within the acoustic cavity 168 is exactly the same or close to the same as the frequency of instability that exists in the region 64. This results in the acoustic cavity 168 damping or absorbing the energy of the acoustic or hydrodynamic instability. As mentioned, the variables of Equation 1 may be manipulated (e.g., through design of the damper 166) to exactly match or closely match the frequency present in the region 64. This may allow for optimization of the damper for a particular fuel nozzle and/or swirler.

Figure 4:
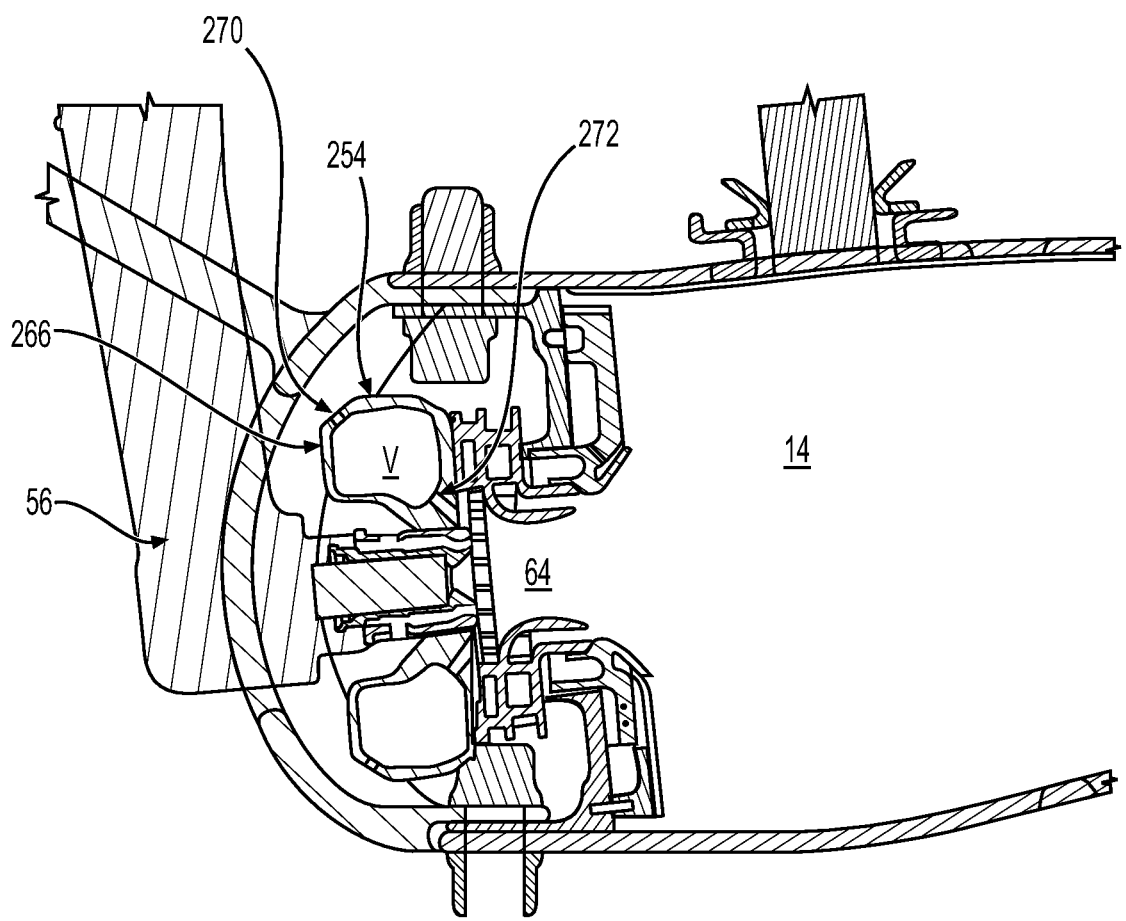
FIG. 4 shows a close-up, schematic, cross-section view of a fuel nozzle having a ferrule with a damper, according to an embodiment of the present disclosure.

Referring to FIG. 4, the damper 166 of FIG. 3 may be applied to a system having purge air passage around the fuel nozzle 56 (e.g., the system of FIG. 2B) rather than through the ferrule (e.g., the system of FIG. 2A). Therefore, the structure, design, and operation of the damper 266 may be the same as discussed with respect to FIG. 3. In FIG. 4, the damper 266 may be designed such that the opening 270 permits either no through flow or very small amount of leakage flow. This is due to the fact that the purge air flow passes around the fuel nozzle 56 and need not pass through the ferrule 254. Thus, the size of the opening 270 may be adjusted to fine tune the dampening of the frequency of the instability in the region 64. Accordingly, in FIG. 3, the neck 172 functions as both a damper neck and a purge air passage and in FIG. 4, the neck 272 functions primarily as a damper neck.

Figure 5E:
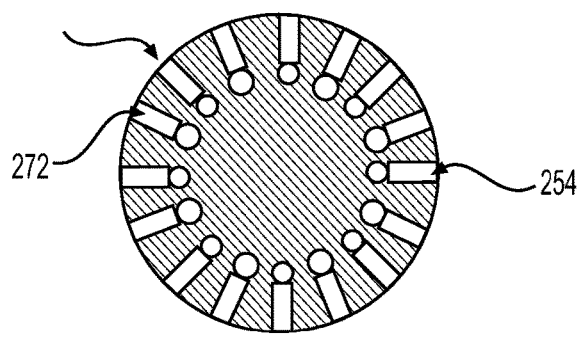
FIG. 5E shows a schematic of the arrangement of the damper neck and purge air passage about the ferrule of FIG. 5A, according to an embodiment of the disclosure.

FIGS. 5A-5E show schematic views of a fuel nozzle having a ferrule with a damper separate from a purge air passage. In particular, FIG. 5A shows a schematic, cross-section view of the fuel nozzle. FIG. 5B shows a schematic, cross-section view of the purge air passage of FIG. 5A taken along the section line A-A of FIG. 5A. FIG. 5C shows a schematic, cross-section view of FIG. 5A rotated about the axis A and showing the damper cavity with associated damper passages. FIG. 5D shows a schematic, cross-section view of the damper cavity of FIG. 5C taken along the section line B-B of FIG. 5C. FIG. 5E shows a schematic of the arrangement of the damper neck and purge air passage annularly about the ferrule of FIG. 5A.

With reference to FIGS. 5A-5E, a schematic of the fuel nozzle 56 having a ferrule 254 with a damper 266 is shown. The damper 266 may be in the ferrule 254. The damper 266 may be formed integrally and unitarily with the ferrule 254. That is, the damper 266 may take the form of an acoustic cavity 268 within the ferrule 254. The ferrule 254 may be annular in shape and positioned around the outer circumference of the fuel nozzle 56. The ferrule 254 may include a purge air passage 276. The acoustic cavity 268 and the purge air passage 276 may be annular in shape and positioned around the outer circumference of the fuel nozzle 56. As shown in FIGS. 5A and 5C, the acoustic cavity 268 and the purge air passage 276 may not intersect and may be separate. That is, there may be no fluid communication between the acoustic cavity 268 and the purge air passage 276.

With continued reference to FIGS. 5A and 5B, the purge air passage 276 may extend between opening 270 and an opening 278. Air may flow through the purge air passage 276 from the opening 270 to the opening 278 and into the swirler 24. The opening 270 may be circular in cross-section. The purge air passage 276 and openings 270, 278 may be sized for the desired air flow therethrough. One or more openings 270, 278 may be provided. For example, as shown in the section view through the purge air passage 276 in FIG. 5B taken along the section line A-A, four openings 270 are shown connecting to a single passage 276 which connects to eight openings 278. Although the number of openings 270 does not equal the number of openings 274, it is contemplated that the numbers may be equal. Any number of openings may be provided to achieve the desired amount of air flow therethrough. The spacing of the openings 270, 278 may be uniform or random. The number, shape, location, size, spacing, or any combination thereof of the openings 270, 278 may be selected based on the desired purge air flow through the ferrule 254.

Referring to FIGS. 5C and 5D, the damper 266 may include a neck 272, neck opening 274, the acoustic cavity 268, and a damper feed hole 280. The volume V of the acoustic cavity 268 may be selected to target a specific frequency of hydrodynamic and/or acoustic instability. The neck 272 may function as a damper neck. The neck 272 and the neck opening 274 may be circular in cross-section. The neck 272 may be positioned at various angles with respect to a central axis through the fuel nozzle 56. The damper feed hole 280 may permit an amount of air from upstream of the combustion section into the acoustic cavity 268 to damping function of the damper 266. The damper feed hole 280 need not be sized or dimensioned to allow purge air flow as this function is achieved with the separate purge air passage 276. One or more openings 280, 274 may be provided. For example, as shown in the section view through the damper 266 in FIG. 5D taken along the section line B-B, four openings 280 are shown connecting to a single annular acoustic cavity 268 which connects to eight openings 274. Although the number of openings 280 does not equal the number of openings 274, it is contemplated that the numbers may be equal. Any number of openings may be provided to achieve dampening of the target frequency. The spacing of the openings 280, 274 may be uniform or random. The number, shape, location, size, spacing, angle, or any combination thereof of the openings 280, 274 and/or the neck 272 may be selected based on the target frequency of the hydrodynamic instability.

FIG. 5E shows a schematic view of the damper passages (e.g., necks 272) and purge air passages 276 of the ferrule 254 as they are placed about the circumference of the ferrule 254. As depicted, the neck 272 is staggered and spaced from the purge air passage 276. Thus, the purge air passage 276 and the damper 266 do not intersect and are not in fluid communication with one another. The purge air passage 276 and damper necks 272 may alternate and may be presented in a pattern to achieve the desired flow characteristics and dampening capabilities.

Accordingly, with reference to FIGS. 5A-5E, during operation, air is permitted to flow through the opening 270 in the purge air passage 276 and air is permitted to also flow through the opening 280 and into the acoustic cavity 268. The air exiting into the swirler 24 creates high pressure and velocity fluctuations in the region 64 and results in a hydrodynamic and/or acoustic instability. However, the damper 266 operates as a Helmholtz cavity. That is, the air that passes into the cavity 268 resonates or vibrates within the acoustic cavity 268. The frequency of vibration of the air within the acoustic cavity 268 is exactly the same or close to the same as the frequency of instability that exists in the region 64. This results in the acoustic cavity 268 damping or absorbing the energy of the acoustic and/or hydrodynamic instability. As mentioned, the variables of Equation 1 may be manipulated (e.g., through design of the damper 266) to exactly match or closely match the frequency present in the region 64. This may allow for optimization of the damper for a particular fuel nozzle and/or swirler.

Figure 6:
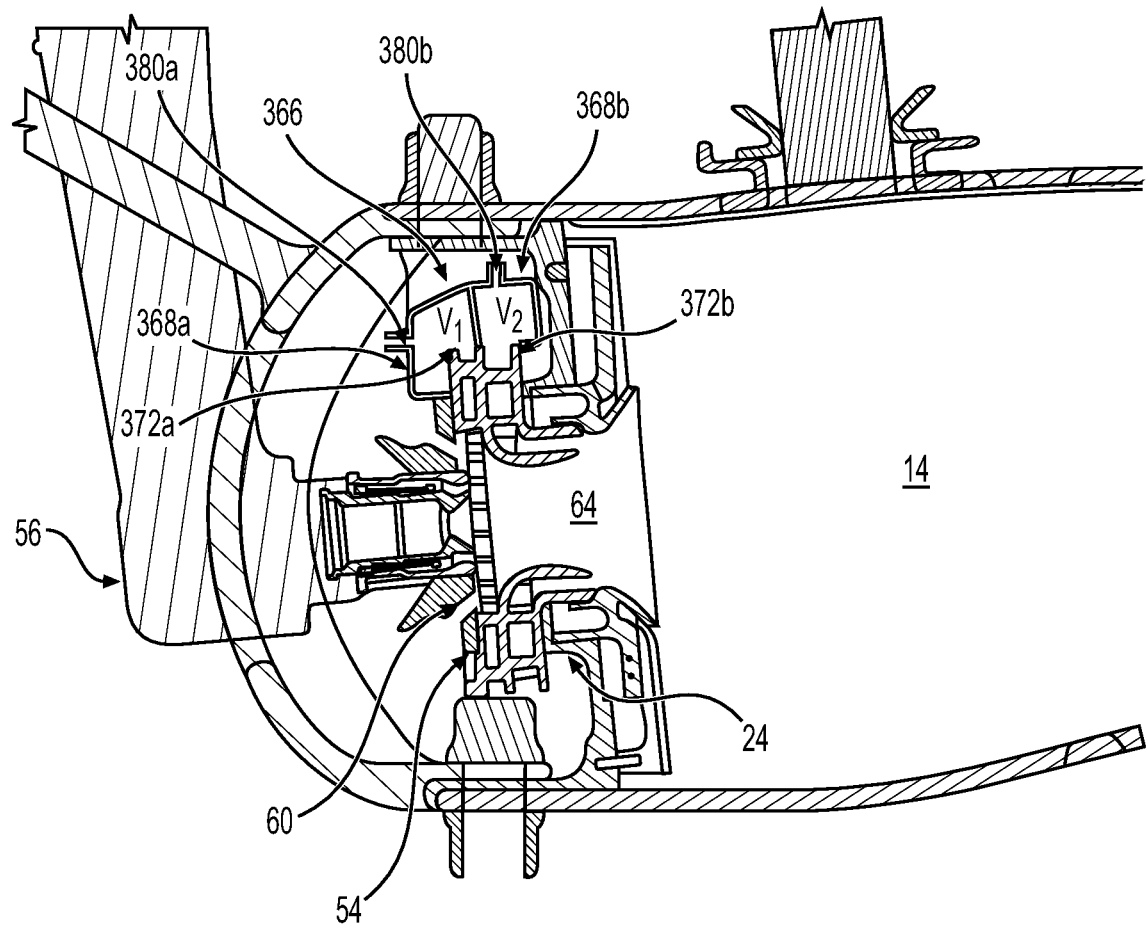
FIG. 6 shows a close-up, schematic, cross-section view of a fuel nozzle having a damper with two volumes, according to an embodiment of the present disclosure.

FIG. 6 shows a close-up, schematic, cross-section view of a fuel nozzle 56 having a ferrule 54 and a damper 366. The damper 366 may be a separate component from the ferrule 54 or may be integrally and unitarily formed with the ferrule 54. The ferrule 54 may permit passage of purge air through the passage 60 as described with respect to FIG. 2A. The damper 366 may be a separate component from the swirler 24 or may be integrally and unitarily formed with the swirler 24. The damper 366 may be annular in shape and positioned around the outer circumference of the swirler 24. The damper 366 may include a first acoustic cavity 368a and a second acoustic cavity 368b. The first acoustic cavity 368a may include a first damper feed hole 380a (receiving air from upstream of the combustion section), a first neck 372a, and a first neck opening (the first neck opening is not visible in the view of FIG. 6 as the first neck opening is circumferentially offset from the first damper feed hole 380a similar to FIG. 5E, the first neck opening may similar to or the same as other neck openings described herein and may open into the interior of the swirler 24). The second acoustic cavity 368b may include a second damper feed hole 380b (receiving air from upstream of the combustion section), a second neck 372b, and a second neck opening (the second neck opening is not visible in the view of FIG. 6 as the second neck opening is circumferentially offset from the second damper feed hole 380b similar to FIG. 5E). The first acoustic cavity 368a may have a volume $V_1$ and the second acoustic cavity 368b may have a volume $V_2$. The first acoustic cavity 368a and the second acoustic cavity 368b may each be an annular. As is discussed herein, the volumes $V_1$ and $V_2$ may be tailored and designed to achieve a particular resonance and dampening capability.

Although a single opening 380a and a single opening 380b are shown, multiple openings of each may be provided. Where multiple openings 380a, 380b are provided, they may be circumferentially spaced around the damper 366. The spacing of the openings 380a, 380b may be uniform or random. The number, shape, location, size, spacing, or any combination thereof of the openings 380a, 380b may be selected based on the target frequency of the hydrodynamic instability in the region 64.

Referring again to FIG. 6, the necks 372a, 372b may each function as a damper neck. The necks 372a, 372b and the neck openings (not visible, opening into the interior of the swirler 24) may be circular in cross-section. The necks 372a, 372b may be positioned at various angles with respect to a central axis through the fuel nozzle 56. Although a single neck 372a, 372b are shown, multiple necks may be provided for each of the acoustic cavities 368a, 368b (see, for example, FIG. 5D showing how multiple necks and openings may be present around the ferrule). Where multiple necks 372a, 372b with necks opening are provided, they may be circumferentially spaced around the damper 366. The spacing of the necks 372a, 372b may be uniform or random. The number, shape, location, size, spacing, angle, or any combination thereof of the necks 372a, 372b and the number, shape, location, size, spacing, angle, or any combination thereof of the neck openings may be selected based on the target frequency of the hydrodynamic instability.

Accordingly, with continued reference to FIG. 6 and during operation, air is permitted to flow through the openings 380a, 380b into the respective acoustic cavity 368a, 368b, through the respective neck 372a, 372b and exits the neck opening into the swirler 24. The air exiting the swirler 24 creates high pressure and velocity fluctuations in the region 64 and results in a hydrodynamic or acoustic instability. However, each of the acoustic cavities 368a, 368b of the damper 366 operates as a Helmholtz cavity. That is, the air that passes into openings 380a, 380b resonates or vibrates within the respective acoustic cavity 368a, 368b. The frequency of vibration of the air within the acoustic cavity 368a, 368b may be exactly the same or close to the same as a frequency of instability that exists in the region 64. In some cases, the frequency of instability in the region 64 may occur at multiple frequencies. In this case, each of the acoustic cavities 368a, 368b may be separately designed to absorb a different frequency. Each volume $V_1$ and $V_2$ may be selected to target a specific frequency of hydrodynamic or acoustic instability. As discussed herein, the neck length and neck opening area may also be modified to achieve a target frequency. The target frequency may be different for each of the acoustic cavities 368a and 368b. This may allow for optimizing the system by allowing multiple frequencies experienced in the region 64 to be dampened or absorbed by the damper 366. This results in the acoustic cavity 368a damping or absorbing the energy of the acoustic or hydrodynamic instability at a first frequency and the acoustic cavity 368b damping or absorbing the energy of the acoustic of hydrodynamic instability at a second frequency. The first frequency may be different than the second frequency. As mentioned, the variables of Equation 1 may be manipulated (e.g., through design of the damper 366 and the respective acoustic cavities 368a, 368b) to exactly match or closely match one or more frequencies present in the region 64. This may allow for optimization of the damper for a particular fuel nozzle and/or swirler.

The cavity 368a may be associated with the primary swirler of the swirler 24 and the cavity 368b may be associated with the secondary swirler of the swirler 24. Thus, the neck 372a may be associate with the primary swirler vane of the swirler 24 and may operate as the neck for a first Helmholtz resonator (e.g., cavity 368a). The neck 372b may be associate with the secondary swirler vane of the swirler 24 and may operate as the neck for a second Helmholtz resonator (e.g., cavity 368b).

Figure 7:
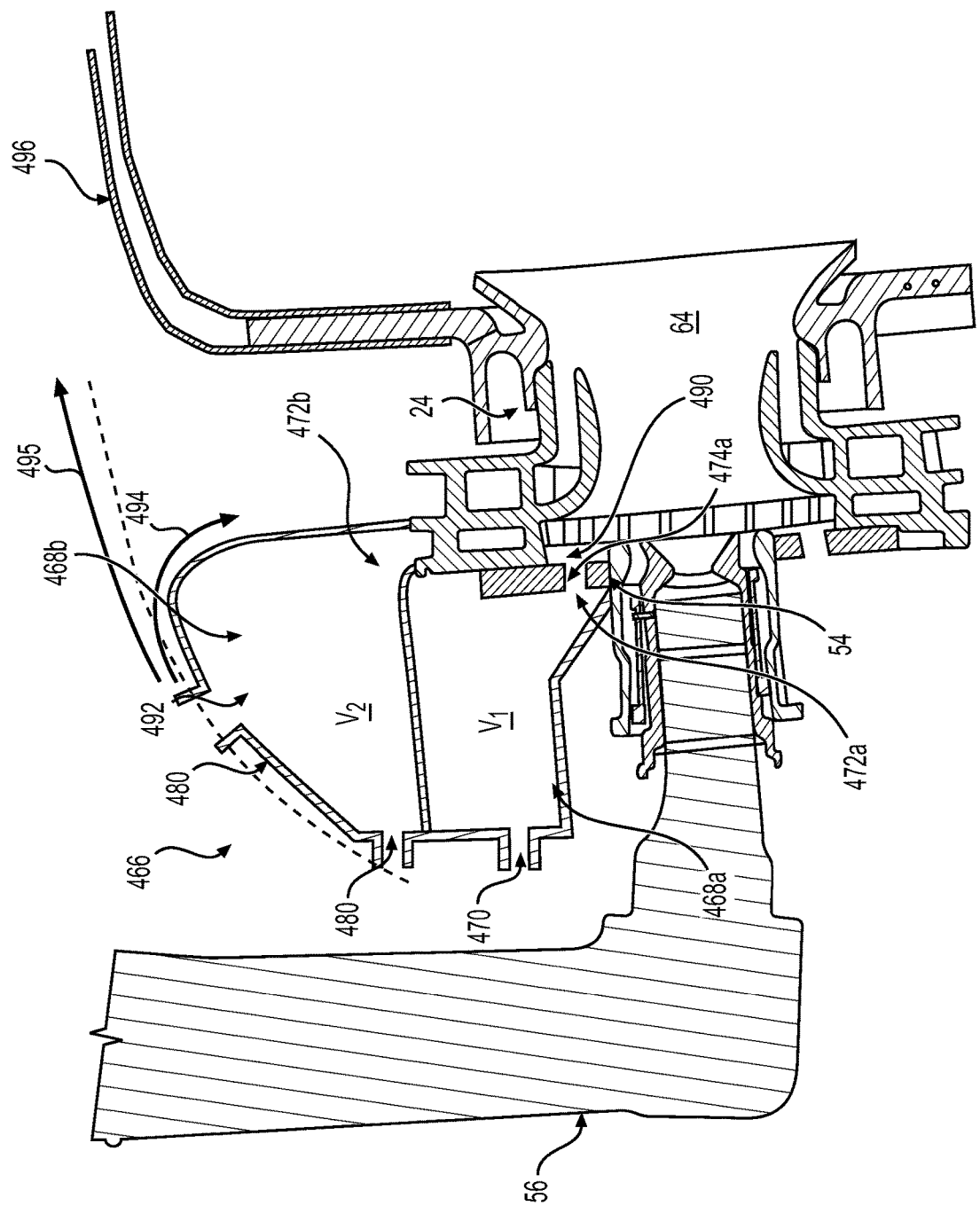
FIG. 7 shows a close-up, schematic, cross-section view of a fuel nozzle having a damper with two volumes, according to an embodiment of the present disclosure.

FIG. 7 shows a close-up, schematic, cross-section view of a fuel nozzle 56 having a ferrule 54 and a damper 466. The damper 466 may be a separate component from the ferrule 54 and the swirler 24 or may be integral and unitary therewith. The damper 466 may be annular in shape and positioned around the outer circumference of the ferrule 54 and the swirler 24. The damper 466 may include a first acoustic cavity 468a arranged in fluid communication with the ferrule 54 and a second acoustic cavity 468b arranged in fluid communication with a primary vane 490 of the swirler 24.

The first acoustic cavity 468a may include an opening 470, a first neck 472a, and a first neck opening 474a. Similar to the damper 166 of FIG. 3, the first acoustic cavity 468a may operate both as a damper and a purge flow passage. Accordingly, as discussed herein, the first acoustic cavity 468a, opening 470, first neck 472a, and first neck opening 474a may be designed to achieve the desired purge flow, the desired frequency dampening, or both. Any of the foregoing variables discussed with the previously examples may thus be altered to achieve the desired flow and/or dampening.

The second acoustic cavity 468b may include a damper feed hole 480, a second neck 472b, and a second neck opening (not visible). The second acoustic cavity 468b may be arranged around the primary swirler vane 490. Accordingly, as discussed with respect to FIG. 6, the acoustic cavity 468b may operate primarily as a damper for the frequency in the region 64. The acoustic cavity 468b may have more than one damper feed hole 480. Although two damper feed holes 480 are shown, more or fewer may be provided. The locations of the feed holes 480 may be changed based on the desired dampening. The first acoustic cavity 468a may have a volume $V_1$ and the second acoustic cavity 468b may have a volume $V_2$. The first acoustic cavity 468a and the second acoustic cavity 468b may each be an annular.

As discussed previously, although a single opening 470 and two openings 480 are shown, more or fewer may be provided. Where multiple openings are provided, they may be circumferentially spaced around the ferrule damper 466. The spacing of the openings may be uniform or random. The number, shape, location, size, spacing, or any combination thereof of the openings may be selected based on the target frequency of the hydrodynamic instability in the region 64 and/or the target flow rate through the cavity (e.g., for the purge air flow through the first cavity 468a). The necks 472a, 472b, may function as previously described herein. The design of the necks may be as discussed previously and may be altered in any of the manners disclosed herein to achieve the desired purge flow, the desired acoustic dampening and absorption, or both the desired purge flow and desired dampening and absorption.

Accordingly, with continued reference to FIG. 7 and during operation, air is permitted to flow through the openings 470 and 480 from upstream of the combustion section into the respective acoustic cavity 468a, 468b, through the respective neck 472a, 472b and exits the neck opening into the swirler 24. The air exiting the swirler 24 creates high pressure and velocity fluctuations in the region 64 and results in a hydrodynamic or acoustic instability. However, each of the acoustic cavities 468a, 468b of the damper 466 operates as a Helmholtz cavity. That is, the air that passes into openings 470 and 480 resonates or vibrates within the respective acoustic cavity 468a, 468b. The frequency of vibration of the air within the acoustic cavity 468a, 468b may be exactly the same or close to the same as a frequency of instability that exists in the region 64. In some cases, the frequency of instability in the region 64 may occur at multiple frequencies. In this case, each of the acoustic cavities 368a, 368b may be separately designed to absorb a different frequency. Each volume $V_1$ and $V_2$ may be selected to target a specific frequency of hydrodynamic or acoustic instability. The target frequency may be different for each of the acoustic cavities 468a and 468b. This may allow for optimizing the system by allowing multiple frequencies experienced in the region 64 to be dampened or absorbed by the damper 466. This results in the acoustic cavity 468a damping or absorbing the energy of the acoustic or hydrodynamic instability at a first frequency and the acoustic cavity 468b damping or absorbing the energy of the acoustic of hydrodynamic instability at a second frequency. The first frequency may be different than the second frequency. As mentioned, the variables of Equation 1 may be manipulated (e.g., through design of the damper 466 and the respective acoustic cavities 468a, 468b) to exactly match or closely match one or more frequencies present in the region 64. This may allow for optimization of the damper for a particular fuel nozzle and/or swirler. Additionally, the first acoustic cavity 468a may further operate as a purge air passage. The volume and openings may be designed to achieve a particular flow through the swirler 24 to dampen the hydrodynamic and/or acoustic instabilities in the region 64.

Furthermore, the outer surface 492 of the damper 466 may operate as a flow conditioning surface for a bypass flow 494 flowing around the outer surface 492. The cowl (e.g., 26 in FIG. 2A) may similarly be omitted and instead an integrated dome and liner 496 may be provided. The integrated dome and liner 496 may be formed of CMC. The integrated dome and liner 496 may be a single, integral and unitary component. The outer surface 492 may distribute the flow of air aerodynamically between the combustor (e.g., flow arrow 494) and passages (e.g., flow arrow 495.

Figure 8:
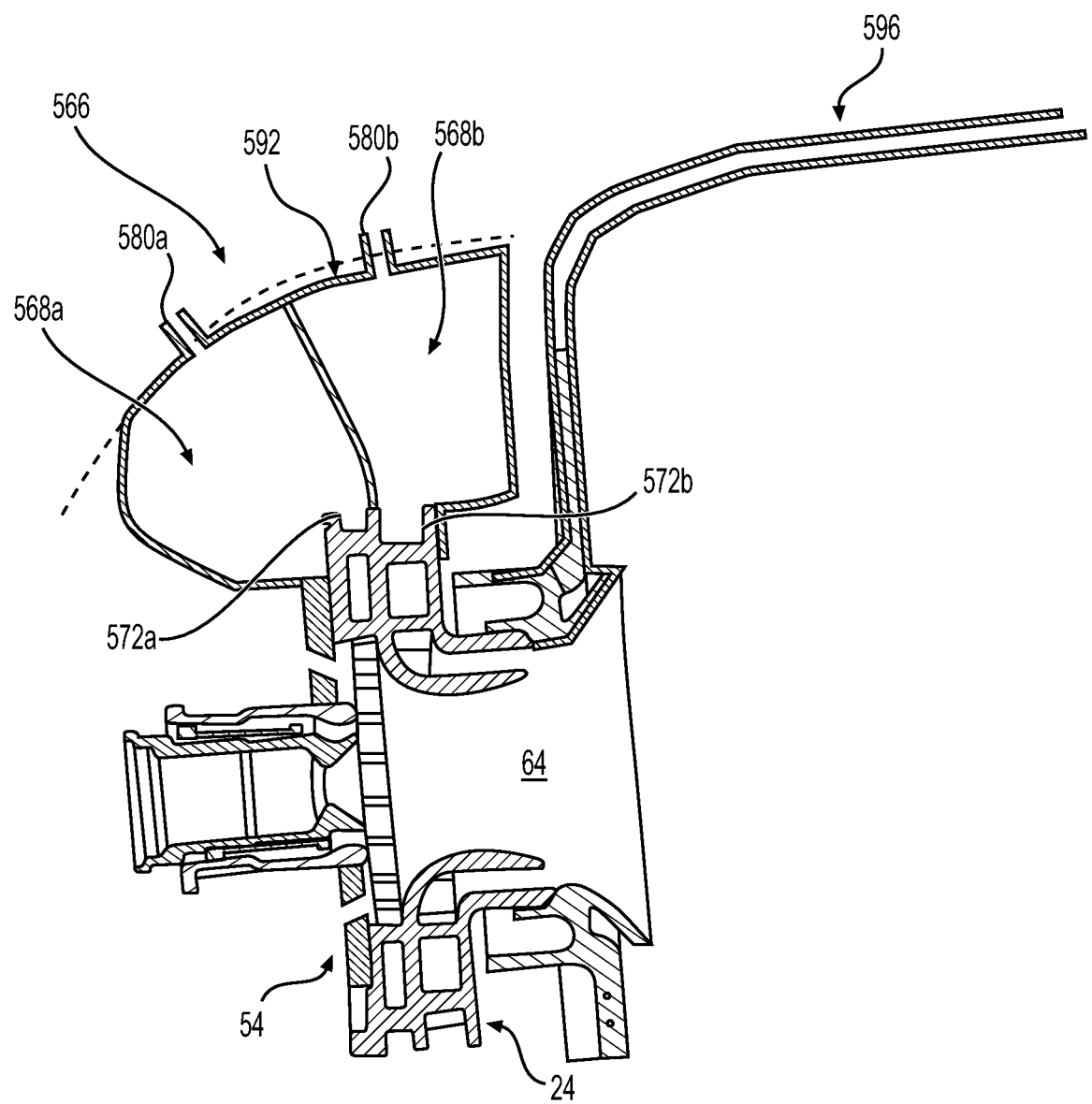
FIG. 8 shows a close-up, schematic, cross-section view of a fuel nozzle having a damper with two volumes, according to an embodiment of the present disclosure.

Referring to FIG. 8, a damper 566 similar to the damper 366 of FIG. 6 is shown. Accordingly, the features and functions of the damper 566 may be the same or similar as the damper 366. Similar to the damper 366, the damper 566 may include a first acoustic cavity 568a and a second acoustic cavity 568b. The damper 566 may include a first neck 572a in a primary vane and a second neck 572b in a secondary vane. The damper 566 may include a first opening 580a and a second opening 580b. Unlike the damper 366 however, the damper 566 is formed with an outer surface 592 that may operate as a flow conditioning surface. Furthermore, the cowl may be omitted and an integrated dome and liner 596 may be provided. The integrated dome and liner 596 may be formed of CMC. The integrated dome and liner 596 may be a single, integral and unitary component. The outer surface 592 operates in the same manner as a cowl (e.g., cowl 20 in FIG. 1) to guide the flow of air over the integrated dome and liner 596. The dampening function of the damper 566 may be as described with respect to previous examples.

Figure 9:
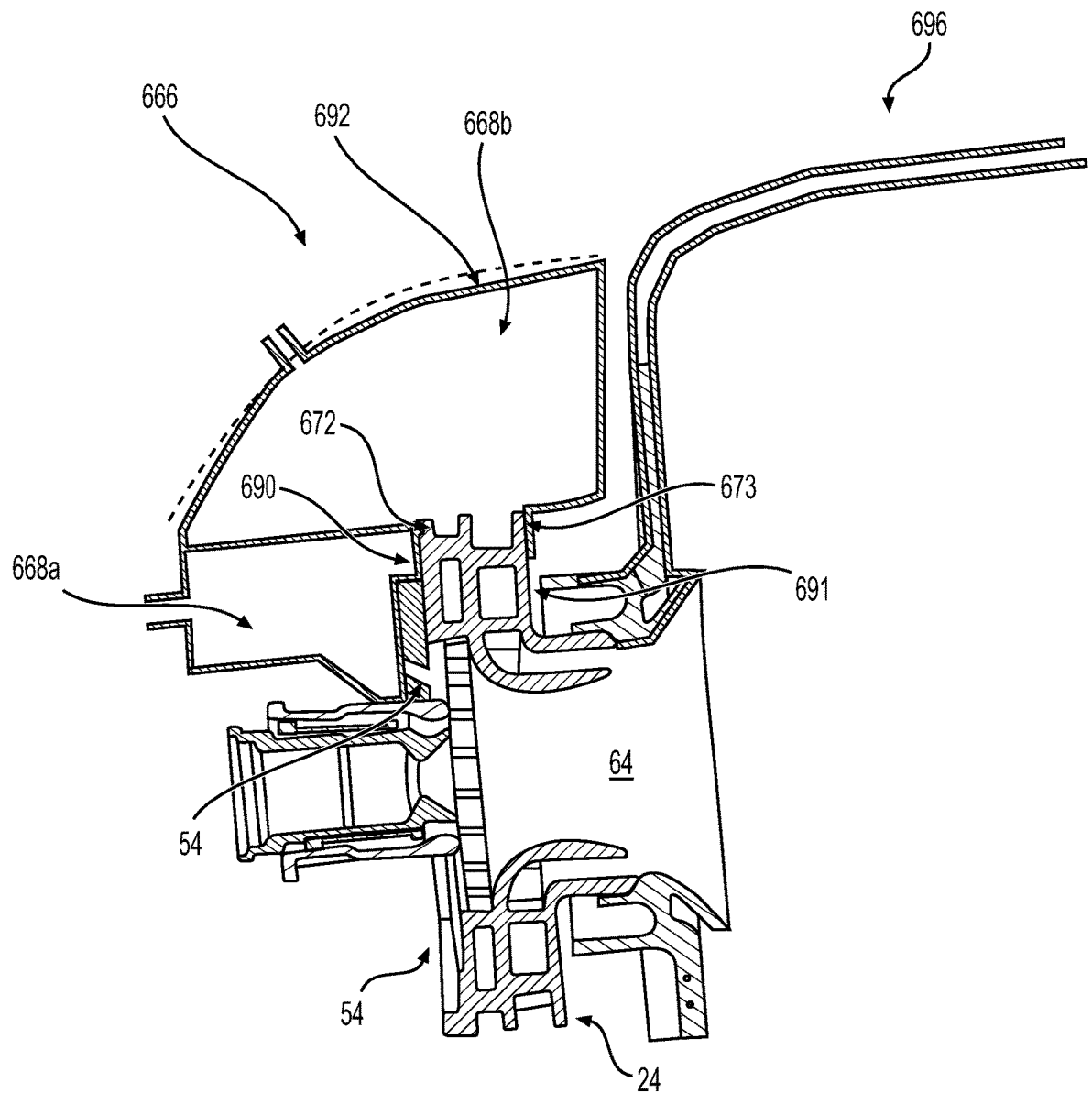
FIG. 9 shows a close-up, schematic, cross-section view of a fuel nozzle having a damper with two volumes, according to an embodiment of the present disclosure.

Referring to FIG. 9, a damper 666 similar to the damper 466 of FIG. 7 is shown. Accordingly, the features and functions of the damper 666 may be the same or similar as the damper 466. Similar to the damper 466, the damper 666 may include a first acoustic cavity 668a and a second acoustic cavity 668b. The damper 666 may also include an outer surface 692 that may operate as a flow conditioning surface to guide the flow of air over an integrated dome and liner 696. The integrated dome and liner 696 may be formed of CMC and may be a single, integral and unitary component. Unlike the damper 466 however, second acoustic cavity 668b is provided with two necks, 672 and 673. The first neck 672 may be aligned with a primary vane 690 on the primary swirler of the swirler 24. The second neck 673 may be aligned with a secondary vane 691 on the secondary swirler of the swirler 24. The second cavity 668b may thus extend around the swirler 24 as a single volume, while the first cavity 668a may extend around the ferrule 54 as a single volume. The cavities 668a and 668b may be separate cavities formed separately and coupled together and/or coupled to the ferrule and swirler, respectively. Alternatively, the cavities 668a and 668b may be formed unitarily in a single component. As previously described, due to the orientation of the view, the openings from the cavities to the interior of the swirler are not visible in FIG. 9. As in prior examples, the volumes may be optimized for flow and dampening capabilities by adjusting variables therein.

Accordingly, in FIG. 9, the first acoustic cavity 668a may form a ferrule damper and the acoustic cavity 668b may form a swirler damper. Each cavity functions as a Helmholtz cavity as previously described herein, and in the case of acoustic cavity 668b, the Helmholtz cavity is provided with two necks. Such a multi-cavity swirler damper can target multiple frequencies of instability in region 64 as described previously.

Figure 10:
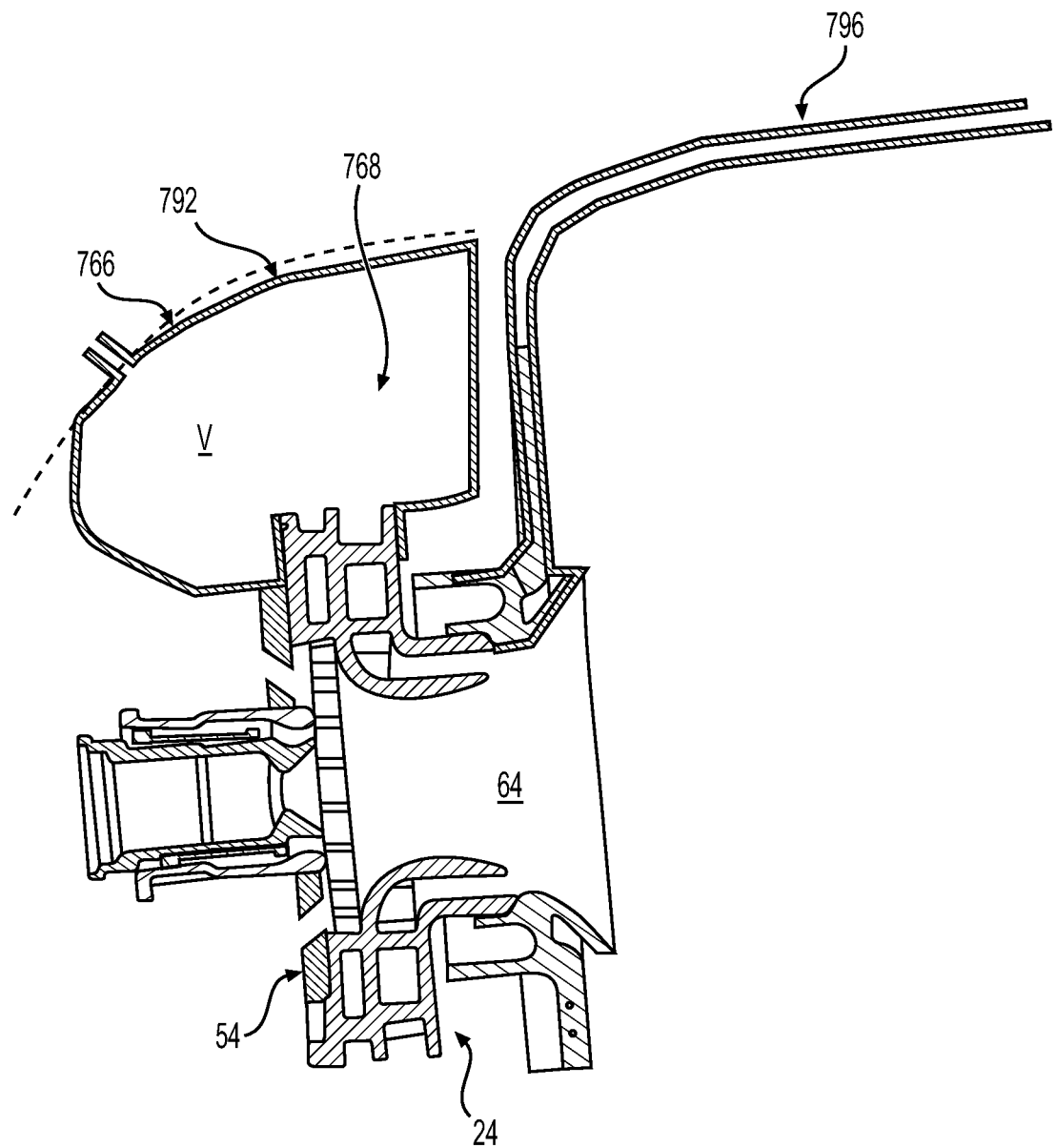
FIG. 10 shows a close-up, schematic, cross-section view of a fuel nozzle having a damper with one volume, according to an embodiment of the present disclosure.

Referring to FIG. 10, a damper 766 similar to the damper 666 of FIG. 9 is shown. Accordingly, the features and functions of the damper 766 may be the same or similar as the damper 666. However, in FIG. 10, a single cavity 768 is provided. The cavity 768 may not be fluidly coupled with the ferrule 54 as in FIG. 9. The cavity 768 may be the same or similar to the cavity 668b of FIG. 9 and may include two necks as previously described positioned about the swirler 24. The ferrule 54 may be a ferrule such as described with respect to FIG. 2 and may allow purge air flow therethrough. The damper 766 may also include an outer surface 792 that may operate as a flow conditioning surface to guide the flow of air over an integrated dome and liner 796. The integrated dome and liner 796 may be formed of CMC and may be a single, integral and unitary component. As in prior examples, the volume V of the acoustic cavity 768, the neck length, and/or the neck opening area may be optimized for flow and dampening capabilities by adjusting variables therein. Accordingly, in FIG. 10, the cavity 768 may target a single frequency of instability within the region 64.

Figure 11:
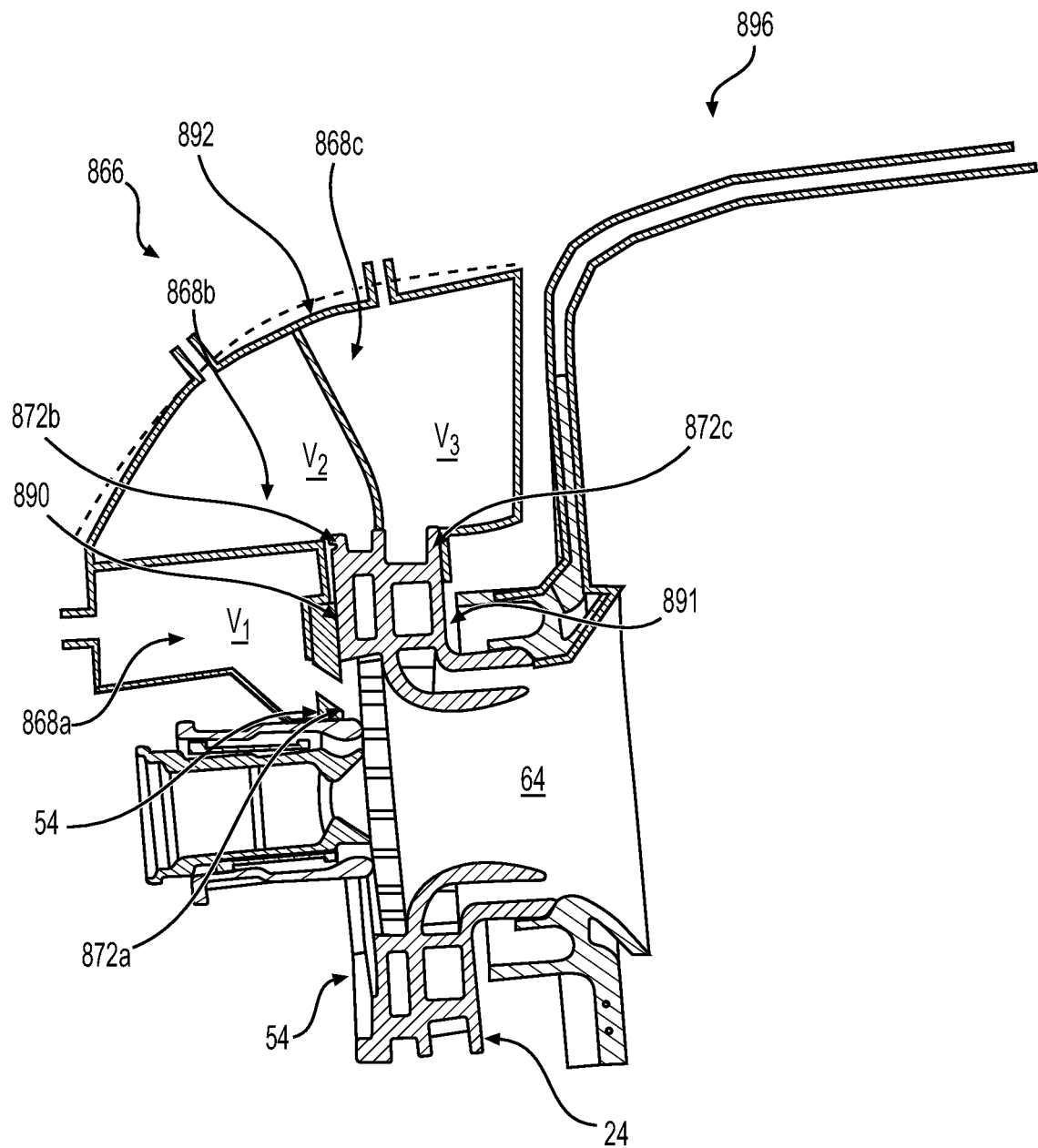
FIG. 11 shows a close-up, schematic, cross-section view of a fuel nozzle having a damper with three volumes, according to an embodiment of the present disclosure.

Referring to FIG. 11, a damper 866 similar to the damper 666 of FIG. 9 is shown. Accordingly, the features and functions of the damper 866 may be the same or similar as the damper 666. However, in FIG. 11, instead of a single cavity 668b extending over both the primary vane and the secondary vane of the swirler, two separate cavities 868b and 868c are provided. The first acoustic cavity 868a may be arranged around the ferrule 54 and may have a neck 872a. The first acoustic cavity 868a may operate as both a purge air flow passage and a Helmholtz cavity for provided dampening of the instability in the region 64. The second acoustic cavity 868b may be arranged around the primary swirler vane 890 and may include a neck 872b. The third acoustic cavity 868c may be arranged around the secondary swirler vane 891 and may include a neck 872c. The second acoustic cavity 868b and the third acoustic cavity 868c may operate primarily as dampers for the frequency in region 64. The ferrule 54 may be a ferrule such as described with respect to FIG. 2 and may allow purge air flow therethrough (e.g., from the first cavity 868a). The damper 866 may also include an outer surface 892 that may operate as a flow conditioning surface to guide the flow of air over an integrated dome and liner 896. The integrated dome and liner 896 may be formed of CMC and may be a single, integral and unitary component. As in prior examples, the volumes $V_1$, $V_2$ and $V_3$ of the acoustic cavities, the neck lengths, and/or the neck opening areas may be optimized for flow and dampening capabilities by adjusting the shape and/or dimensions. Accordingly, in FIG. 11, the cavities 868a, 868b, and 868c may target three frequencies of instability within the region 64.

As described herein, the opening (e.g., cavity feed opening), the neck, the neck opening, and the volume of the acoustic cavity may be variables which affect both the purge air flow through the damper as well as the frequency at which the damper is effective. Any of the variables, alone or in combination, may be altered to achieve the desired absorption of the target frequency. The alteration may be the size or dimension (e.g., diameter, length, or volume), the number of openings, the placement along the damper, the angle, etc. Therefore, one may optimize the damper simply by changing the volume of the acoustic cavity, for example. Or, for example, one may alter the volume as well as the total area of the neck opening.

Figure 12:
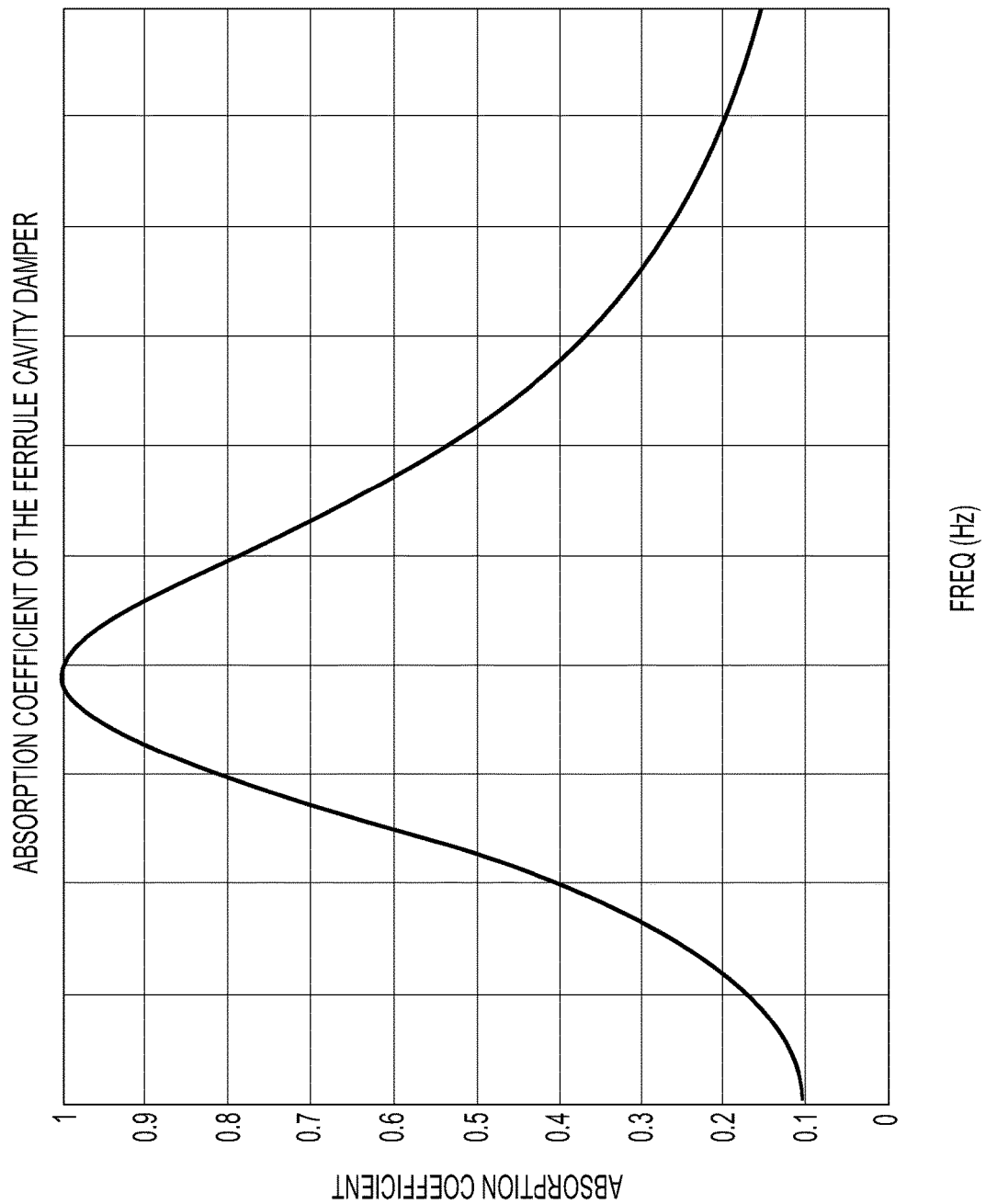
FIG. 12 shows a graph of absorption coefficient versus frequency, according to an embodiment of the present disclosure.

The closer to the target frequency of the hydrodynamic instability that the damper is designed, the higher the absorption coefficient. A higher absorption coefficient results in higher absorption of the target frequency. An exemplary graph showing this effect is shown in FIG. 12 where absorption coefficient is plotted versus frequency (in Hertz). The graph may show the absorption coefficient of the ferrule cavity damper. Although described with respect to the ferrule cavity damper, a similar graph may exist for the other dampers described herein. In FIG. 12, the damper has been optimized for a predetermined or target frequency. Accordingly, as the frequency approaches the target frequency (shown as the curve moves along the x-axis), the absorption coefficient of the damper approaches one (shown as the curve moves along the y-axis), which may result in complete or near complete absorption of the target frequency of the hydrodynamic instability.

Figure 13:
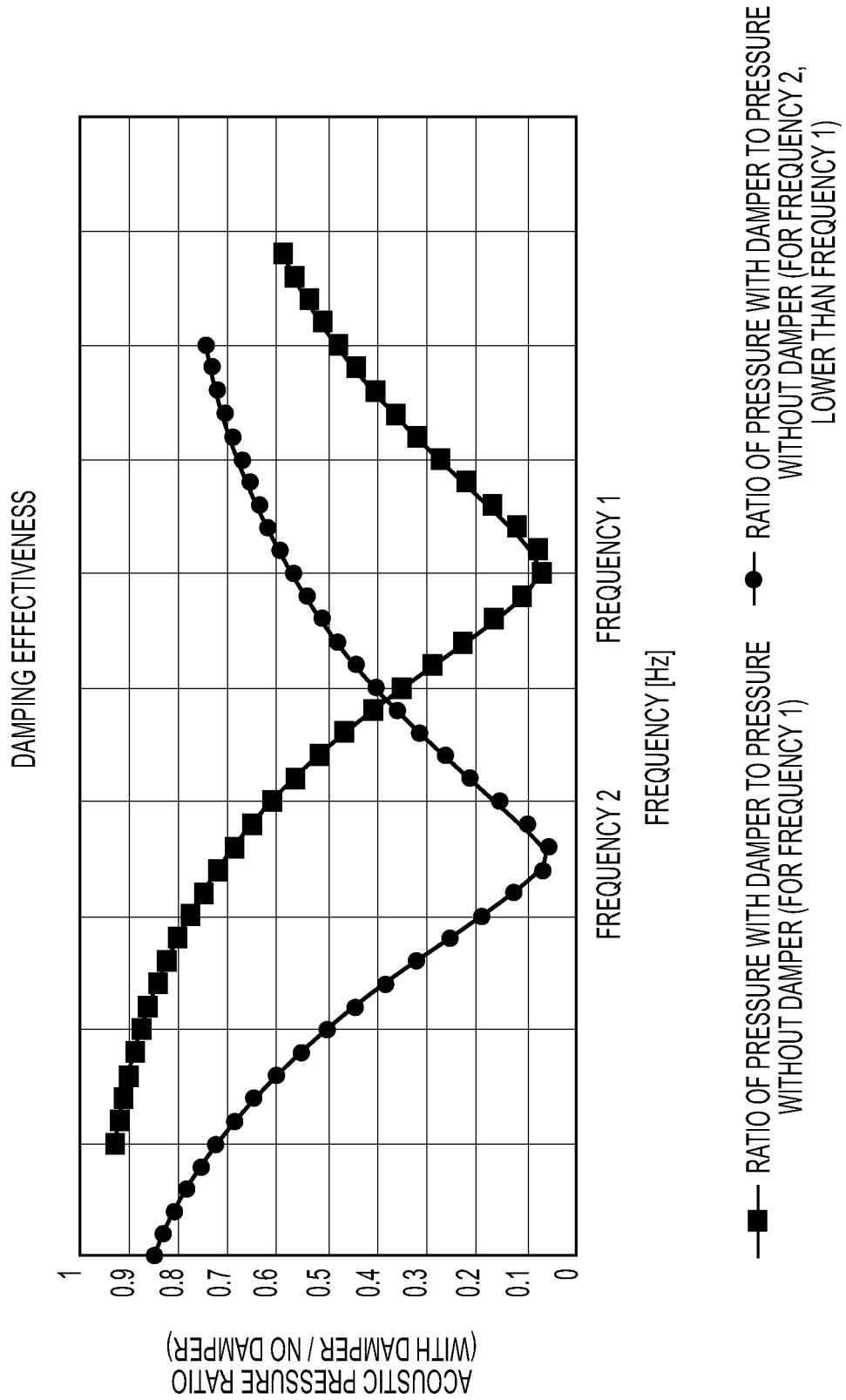
FIG. 13 shows a graph of damping effectiveness of a ferrule cavity, according to an embodiment of the present disclosure.

Referring to FIG. 13, a graph showing the damping effectiveness of a ferrule cavity damper is shown. Although described with respect to the ferrule cavity damper, a similar graph may exist for the other dampers described herein. As shown in the graph, for a target frequency "Frequency 1", the pressure ratio for a system having a damper of the present disclosure versus a system without a damper approaches 0 at the target frequency. As shown in the graph, for a target frequency "Frequency 2", the pressure ratio for a system having a damper versus a system without a damper approaches 0 at the target frequency. This represents the effectiveness of the damping capability of the dampers of the present disclosure. As discussed herein, the dampers may be shaped, dimensioned, or otherwise designed to resonate at or near "Frequency 1" and "Frequency 2." The target frequency may be adjusted solely by changing the volume of the acoustic cavity, the neck length, neck opening area, or by changing any combination of the neck length, neck opening area, and cavity volume.

The acoustic damper of the present disclosure may include an opening (e.g., a cavity feed hole) to permit passage of purge air from upstream of the combustion chamber through the acoustic cavity. This cavity feed hole may be designed to meter flow into the acoustic cavity. The cavity feed hole may be sized and located based on the desired amount of purge air flow through the acoustic cavity. The number of openings may be selected to achieve the target flow through the acoustic cavity. In some examples, the opening permitting purge flow may also act as a damper feed hole.

The acoustic damper of the present disclosure may be provided on the cold side of the combustion section 10 (e.g., prior to ignition of the fuel) such that there is no risk for hot gas ingestion. The acoustic damper of the present disclosure may be formed as a separate part from the ferrule and/or the swirler. The acoustic damper of the present disclosure may be formed within the ferrule. The acoustic damper of the present disclosure may be formed to be replaced and/or interchanged such that the damper may be removed for maintenance or repair and/or may be removed, replaced, or interchanged to allow for a particular frequency of the hydrodynamic instability to be targeted (e.g., to allow for tunability for different frequencies or flows).

According to embodiments of the present disclosure, the acoustic damper may be provided within the ferrule, within a component located around the swirler or a portion of the swirler, around the ferrule or a portion of the ferrule, or around both the swirler and the ferrule or around any portion thereof. Any number of cavities may be provided in any arrangement around the ferrule and/or the swirler. Although examples of one cavity, two cavities, and three cavities are shown, more cavities may be provided. The number of cavities provided may correspond to the number of different frequencies exhibited by the instability in the region within the swirler. Although not shown, other arrangements of the cavities about the ferrule and swirler are contemplated. For example, a damper where the first acoustic cavity is arranged with the ferrule and the second acoustic cavity is arranged with the secondary swirler vane. The location and number of the cavities may be selected to achieve the desired dampening effect.

Accordingly, the advantages of the present disclosure may include providing a multi-volume damper that may function as an acoustic damper as well as a flow-conditioning surface, providing a damper that may directly interact with the source of the instability and therefore provide an effective solution for hydrodynamic and/or acoustic instability, providing a damper that is located on the cold side of the combustion section to avoid risk from hot gas ingestion, and provide easy replacement of parts (e.g., a ferrule with a cavity) for maintenance and tunability for different frequency or flow. The present disclosure allows for suppressing the instabilities without having to change other combustor designs, such as fuel nozzles and swirlers.

The dampers of the present disclosure provide for a system and method for suppressing hydrodynamic and acoustic instability from swirlers for reducing flow dynamics. This may be accomplished by employing multi-cavity dampers surrounding swirlers as well as a cavity embedded in the ferrule. The shape of the capability surrounding the swirlers can have aerodynamic shape as well that may be used a s flow conditioning device as well as acoustic damper.

Conventional swirl-cup design employs a ferrule, a fuel nozzle and a swirler, where the ferrule is used to mount the fuel nozzle and interface with the swirler and may add purge flow as well. Swirlers may generate a hydrodynamic instability that may generate a large fluctuation of pressure and velocity that may lead to combustion dynamics. The dampers of the present disclosure propose acoustic cavities surrounding the swirler as well as the ferrule so that the resulting Helmholtz resonator may add damping at the target hydrodynamic instability frequency.

Conventional combustor design may use a cowl to distribute the flow aerodynamically between the combustor and passages. In the present disclosure, the outer surface of the multi-chamber acoustic cavity function as flow conditioning device as well as acoustic dampers.

A multi-cavity swirler damper may house an embedded acoustic cavity on the ferrule, a primary swirler with dedicated or common cavity and a secondary swirler with dedicated or common cavity. Each cavity and neck combination may be sized for required flow and damping performance.

The damper of the present disclosure may suppress hydrodynamic and/or acoustic instability in the swirl-cup by introducing acoustic cavities and mitigate combustion dynamics. The damper of the present disclosure may provide flow conditioning surfaces without using a cowl structure.

The multi-volume damper of the present disclosure may directly interact with the surface of the instability and therefore be an effective solution for hydrodynamic and/or acoustic instability. The damper may be located on the cold side with no risk for hot gas ingestion. The damper may be an easy replacement part (ferrule with cavity) for maintenance and tunability for different frequency or flow. Acoustic forced response analysis (e.g., FIGS. 12 and 13) may demonstrate the effectiveness of cavities located near the surface of the hydrodynamic instability. Without the dampers of the present disclosure, one would have to change other combustor designs such as fuel nozzles and swirlers and iterate until a satisfactory level of combustion dynamics is achieved.

Further aspects of the present disclosure are provided by the subject matter of the following clauses.

1. A gas turbine engine comprising: a combustion section having a cold side and a hot side, wherein the cold side of the combustion section comprises: a fuel nozzle; a swirler; a ferrule configured to mount and center the fuel nozzle with the swirler; and a damper having an acoustic cavity, a damper neck, and a damper neck opening, wherein the damper operates as Helmholtz cavity and is configured to absorb a hydrodynamic or acoustic instability present in a region within an interior of the swirler.

2. The gas turbine engine of any preceding clause, wherein the damper is annular in cross-section.

3. The gas turbine engine of any preceding clause, wherein the damper is integral and unitary with the ferrule such that the acoustic cavity is within a body of the ferrule.

4. The gas turbine engine any preceding clause, wherein the acoustic cavity further operates as a purge air passage.

5. The gas turbine engine of any preceding clause, wherein the acoustic cavity is separate from and is not in fluid communication with a purge air passage in the ferrule.

6. The gas turbine engine of any preceding clause, wherein the hydrodynamic or acoustic instability occurs at a first frequency and wherein the damper is configured to resonate at the first frequency based on an area of the damper neck opening, a length of the damper neck, a volume of the acoustic cavity, or any combination thereof.

7. The gas turbine engine of any preceding clause, wherein the damper has a high absorption coefficient of about one at the first frequency.

8. The gas turbine engine of any preceding clause, further comprising an integrated dome and liner.

9. The gas turbine engine of any preceding clause, wherein an outer surface of the damper operates as a flow conditioning surface configured to guide air flow into the combustion section.

10. The gas turbine engine of any preceding clause, wherein the acoustic cavity is a multi-volume acoustic cavity having more than one volume, and wherein each of the more than one volume are configured to resonate at the same frequency or at a different frequency.

11. The gas turbine engine of any preceding clause, wherein the acoustic cavity is a first acoustic cavity and a second acoustic cavity, the first acoustic cavity arranged around a primary vane of the swirler and the second acoustic cavity arranged around a secondary vane of the swirler.

12. The gas turbine engine of any preceding clause, wherein the acoustic cavity is a first acoustic cavity and a second acoustic cavity, the first acoustic cavity arranged around the ferrule and the second acoustic cavity arranged around a primary vane of the swirler.

13. The gas turbine engine of any preceding clause, wherein the acoustic cavity is a first acoustic cavity and a second acoustic cavity, the first acoustic cavity arranged around the ferrule and the second acoustic cavity arranged around a primary vane and a secondary vane of the swirler.

14. The gas turbine engine of any preceding clause, wherein the acoustic cavity is arranged around a primary vane and a secondary vane of the swirler, and wherein the damper neck is a first damper neck at the primary vane and a second damper neck at the secondary vane.

15. The gas turbine engine of any preceding clause, wherein the acoustic cavity is a first acoustic cavity, a second acoustic cavity and a third acoustic cavity, the first cavity arranged around the ferrule, the second acoustic cavity arranged around a primary vane of the swirler and the third acoustic cavity arranged around a secondary vane of the swirler.

16. A damper for suppressing a hydrodynamic or acoustic instability in a combustion chamber of a gas turbine engine, the damper comprising: an acoustic cavity having a volume; a cavity feed hole configured to provide air to the acoustic cavity; and a damper neck, wherein the acoustic cavity, the cavity feed hole, and the damper neck are integral and unitary within a body of a ferrule, and wherein the acoustic cavity, the cavity feed hole, and the damper neck are dimensioned to absorb a frequency of hydrodynamic or acoustic instability in the combustion chamber.

17. The damper of any preceding clause, wherein the acoustic cavity, the cavity feed hole, and the damper neck are configured to function as a purge air passage.

18. The damper of any preceding clause, wherein the acoustic cavity, the cavity feed hole, and the damper neck are all separate from and are not in fluid communication with a purge air passage in the ferrule.

19. The damper of any preceding clause, wherein the acoustic cavity is a first acoustic cavity and a second acoustic cavity, and wherein the first acoustic cavity is dimensioned to resonate at a first frequency and the second acoustic cavity is dimensioned to resonate at a second frequency, the first frequency being different than or the same as the second frequency.

20. A gas turbine engine comprising: a fuel nozzle mounted in a ferrule; a swirler configured to mix air and fuel in a combustion section; and a damper integral and unitary with the ferrule, wherein the damper is dimensioned to absorb a frequency of hydrodynamic or acoustic instability in the swirler.

Although the foregoing description is directed to the preferred embodiments, it is noted that other variations and modifications will be apparent to those skilled in the art, and may be made without departing from the spirit or scope of the present disclosure. Moreover, features described in connection with one embodiment of the present disclosure may be used in conjunction with other embodiments, even if not explicitly stated above.

The invention claimed is:
1. A gas turbine engine comprising:
a combustion section having a cold side and a hot side, wherein the hot side defines a combustion chamber and the cold side of the combustion section comprises:

a fuel nozzle;

a swirler extending from a forward end to an aft end;

a ferrule located upstream of the forward end of the swirler and configured to mount and center the fuel nozzle with the swirler; and a damper located directly upstream of the forward end of the swirler and having an acoustic cavity, a damper neck, and a damper neck opening, wherein the damper provides a first portion of air, operates as a Helmholtz cavity, and is configured to absorb a hydrodynamic or acoustic instability present in a region within an interior of the swirler, and wherein the swirler directs a second portion of the air to the region in which fuel from the fuel nozzle is mixed with the first portion of the air and the second portion of the air before entering the combustion chamber.

2. The gas turbine engine of claim 1, wherein the damper is annular in cross-section.

3. The gas turbine engine of claim 1, wherein the damper is integral and unitary with the ferrule such that the acoustic cavity is within a body of the ferrule.

4. The gas turbine engine of claim 1, wherein the acoustic cavity further operates as a purge air passage.

5. The gas turbine engine of claim 1, wherein the acoustic cavity is separate from and is not in fluid communication with a purge air passage in the ferrule.

6. The gas turbine engine of claim 1, wherein the hydrodynamic or acoustic instability occurs at a first frequency and wherein the damper is configured to resonate at the first frequency based on an area of the damper neck opening, a length of the damper neck, a volume of the acoustic cavity, or any combination thereof.

7. The gas turbine engine of claim 6, wherein the damper has a high absorption coefficient of about one at the first frequency.

8. The gas turbine engine of claim 1, further comprising an integrated dome and liner.

9. The gas turbine engine of claim 1, wherein an outer surface of the damper operates as a flow conditioning surface configured to guide air flow into the combustion section.

10. The gas turbine engine of claim 1, wherein the acoustic cavity is a multi-volume acoustic cavity having more than one volume, and wherein each of the more than one volume is configured to resonate at the same frequency or at a different frequency.

11. The gas turbine engine of claim 1, wherein the acoustic cavity is a first acoustic cavity and a second acoustic cavity, the first acoustic cavity arranged around a primary vane of the swirler and the second acoustic cavity arranged around a secondary vane of the swirler.

12. The gas turbine engine of claim 1, wherein the acoustic cavity is a first acoustic cavity and a second acoustic cavity, the first acoustic cavity arranged around the ferrule and the second acoustic cavity arranged around a primary vane of the swirler.

13. The gas turbine engine of claim 1, wherein the acoustic cavity is a first acoustic cavity and a second acoustic cavity, the first acoustic cavity arranged around the ferrule and the second acoustic cavity arranged around a primary vane and a secondary vane of the swirler.

14. The gas turbine engine of claim 1, wherein the acoustic cavity is arranged around a primary vane and a secondary vane of the swirler, and wherein the damper neck is a first damper neck at the primary vane and a second damper neck at the secondary vane.

15. The gas turbine engine of claim 1, wherein the acoustic cavity is a first acoustic cavity, a second cavity and a third acoustic cavity, the first acoustic cavity arranged around the ferrule, the second acoustic cavity arranged around a primary vane of the swirler and the third acoustic cavity arranged around a secondary vane of the swirler.

16. A damper for suppressing a hydrodynamic or acoustic instability in a combustion chamber of a gas turbine engine, the damper comprising:

a ferrule configured to mount and center a fuel nozzle in a swirler, the ferrule including:

an acoustic cavity having a volume;

a cavity feed hole configured to provide a first portion of air to the acoustic cavity; and a damper neck, wherein the acoustic cavity, the cavity feed hole, and the damper neck are integral and unitary within a body of the ferrule, wherein the acoustic cavity, the cavity feed hole, and the damper neck are dimensioned to absorb a frequency of hydrodynamic or acoustic instability in the combustion chamber, and wherein a downstream wall of the ferrule is axially forward of an upstream wall of the swirler, and the swirler directs a second portion of the air to a region within an interior of the swirler in which fuel from the fuel nozzle is mixed with the first portion of the air and the second portion of the air before entering the combustion chamber.

17. The damper of claim 16, wherein the acoustic cavity, the cavity feed hole, and the damper neck are configured to function as a purge air passage.

18. The damper of claim 16, wherein the acoustic cavity, the cavity feed hole, and the damper neck are all separate from and are not in fluid communication with a purge air passage in the ferrule.

19. The damper of claim 16, wherein the acoustic cavity is a first acoustic cavity and a second acoustic cavity, and wherein the first acoustic cavity is dimensioned to resonate at a first frequency and the second acoustic cavity is dimensioned to resonate at a second frequency, the first frequency being different than or the same as the second frequency.

20. A gas turbine engine comprising:

a fuel nozzle mounted in a ferrule;

a swirler configured to mix a first portion of air and fuel in a combustion section; and a damper integral and unitary with the ferrule, wherein the damper provides a second portion of the air and is dimensioned to absorb a frequency of hydrodynamic or acoustic instability in the swirler, and wherein a downstream wall of the ferrule is axially forward of an upstream wall of the swirler, and the swirler directs the first portion of the air to a region within an interior of the swirler in which fuel from the fuel nozzle is mixed with the first portion of the air and the second portion of the air before entering a combustion chamber of the combustion section.

* * * * *